United States Patent
Dewan

[19]

[11] Patent Number: 5,905,567
[45] Date of Patent: *May 18, 1999

[54] METHOD AND APPARATUS FOR OPTIMIZING SUB-PIXEL RESOLUTION IN A TRIANGULATION BASED DISTANCE MEASURING DEVICE

[75] Inventor: Brian Dewan, Vancouver, Canada

[73] Assignee: CAE Newnes Ltd., Salmon Arm, Canada

[ * ] Notice: This patent is subject to a terminal disclaimer.

[21] Appl. No.: 08/851,282

[22] Filed: May 5, 1997

Related U.S. Application Data

[63] Continuation-in-part of application No. 08/217,678, Mar. 25, 1994, Pat. No. 5,627,635.

[51] Int. Cl.$^6$ .............................. G01C 3/00; G01B 11/28; G01N 21/00
[52] U.S. Cl. ............... 356/3.06; 250/201.6; 250/559.25; 356/379; 356/384
[58] Field of Search .................................. 356/3.06, 379, 356/384; 250/559.25, 201.6

[56] References Cited

U.S. PATENT DOCUMENTS

| | | | |
|---|---|---|---|
| 3,671,726 | 6/1972 | Kerr | 235/151.3 |
| 3,723,003 | 3/1973 | Vockenhuber et al. | 356/4 |
| 4,248,532 | 2/1981 | Nosler | 356/1 |
| 4,346,988 | 8/1982 | Kimura et al. | 356/1 |
| 4,373,804 | 2/1983 | Pryor et al. | 356/1 |
| 4,391,513 | 7/1983 | Fujiki | 356/1 |
| 4,575,237 | 3/1986 | Suzuki | 356/1 |
| 4,631,397 | 12/1986 | Ohsato et al. | 250/201 |
| 4,673,817 | 6/1987 | Oomen | 250/561 |
| 4,708,483 | 11/1987 | Lorenz | 356/376 |
| 4,733,969 | 3/1988 | Case et al. | 356/375 |
| 4,943,157 | 7/1990 | Reding | 356/1 |
| 4,963,017 | 10/1990 | Schneiter et al. | 356/1 |
| 5,056,922 | 10/1991 | Cielo et al. | 356/376 |
| 5,082,362 | 1/1992 | Schneiter | 356/1 |
| 5,113,080 | 5/1992 | Leu et al. | 250/561 |
| 5,164,579 | 11/1992 | Pryor et al. | 250/206.1 |

FOREIGN PATENT DOCUMENTS

| | | | |
|---|---|---|---|
| 1307051 | 9/1992 | Canada | 354/45 |
| 0 559 120 A1 | 3/1993 | European Pat. Off. | |
| 2051514 | 4/1980 | United Kingdom. | |

OTHER PUBLICATIONS

Scheimpflug, T, Photographische Korrespondenz 43, 516, 1906.
Brown, N, Trans. Opthal. Soc., 89, 397, 1969.
Bickel, G. et al., Opt. Eng. 24 (6), 975–977, 1985.
Lorenz R., The Theory and Design of Optical/Electronic Probes for High performance Measurement of Parts. PHD Thesis. U.Wisc–Mad., Dec. 1984.

(List continued on next page.)

*Primary Examiner*—Stephen C. Buczinski
*Attorney, Agent, or Firm*—Antony C. Edwards

[57] ABSTRACT

An apparatus for optimizing sub-pixel resolution in a triangulation based target distance measuring device at a desired stand-off distance has a laser light source projecting a light beam along a light beam axis so as to project a light spot onto a surface of a workpiece, a lens having an optical axis and a depth of focus dependant on the target distance, the lens for gathering light reflected from the light spot on the surface of the workpiece, a linear photodetector array of adjacent light detecting pixels, the array having a longitudinal array axis, the array for detecting light impinging the pixels and generating an output signal indicative of the position of the pixels being impinged by the light, the light beam axis, the optical axis, and the longitudinal array axis co-planar, the lens imaging the reflected light across and impinging the array so as to form an image across the array, the output signal indicative of an intensity profile of the image impinging the array, the image defocused to a near-Scheimpflug condition so as to optimize the output signal from the array, whereby movement of the surface of the workpiece relative to the distance measuring device while the light spot is projected onto the surface causes corresponding movement of the image along the array.

12 Claims, 29 Drawing Sheets

OTHER PUBLICATIONS

Rioux, M. et al., Opt Eng. 26 (12), 1245–1250, 1987.
Lorenz, R., SPIE Vo. 728: Optics. Illum. and Image Sensing for Machine Vision, 152–158, 1986.
Cielo, P. et al., Optics and Laser Technology, vol. 20, No. 1, 19–24, Feb. 1986.
Oomen, G.L. et al., Proc. SPIE 449, 62–71, 1984.
Jones et al., SPIE, vol. 954. Optical Testing and Metrology II, 1988.

a c a  b  c c a b c c a  b  c c a        b c a b,c a b,c

METHOD AND APPARATUS FOR OPTIMIZING SUB-PIXEL RESOLUTION IN A TRIANGULATION BASED DISTANCE MEASURING DEVICE

This is a continuation of U.S. patent application Ser. No. 08/217,678 filed Mar. 25, 1994, now U.S. Pat. No. 5,627,635.

FIELD OF THE INVENTION

This invention relates to the field of triangulation based electro-optical distance measuring devices and in particular to a method and apparatus for optimizing sub-pixel resolution in such devices.

BACKGROUND OF THE INVENTION

When processing logs in a sawmill, it is desirable to maximize the volume of the sawn lumber that can be obtained from any one log. It has been found useful to map the shape of raw wood and in particular logs or lumber, and process such information by means of optimizing algorithms so that the wood or the saw may be positioned to maximize the volume of boards cut.

In order to map the surface profile of a log or cant, remote sensors have been employed such as those taught in U.S. Pat. No. 5,056,922 which issued Oct. 15, 1991 to Cielo et al for a Method and Apparatus for Monitoring the Surface Profile of a Moving Work Piece. Cielo et al teaches an apparatus for three-dimensional surface profiling based on triangulation. Triangulation consists of projecting a beam of light to form a luminous spot on the surface to be profiled. It is the location of the luminous spot whose position is to be measured. Viewing the projected spot from an angle relative to the light beam, and determining the position of the reflected spot image allows the instantaneous distance to the surface of the log or cant to be gauged.

Cielo et al discloses a light projecting system which projects more than one discreet co-planar light beam onto the reflecting surface to be profiled, each light beam at a different angle of instance. An optical means such as a lens gathers the light beams reflected from the surface being profiled (hereinafter the "target surface") and images those reflected beams onto a means for detecting each of the light beams such as an array of photo-sensitive pixels. The photo-sensitive pixels, when struck by a light beam, generate an electrical signal. In the array, the location of the pixels generating such signals, relative to the light source, are indicative of distance to the target surface because of the triangulation geometry between the light source and the imaged spot on the array.

Cielo et al teaches using a line array photo-detector aligned relative to an objective lens so that the projection of their axes intersects at a point on the target surface, that is, the object plane, thus satisfying the so-called Scheimpflug condition for focusing a lens. Cielo et al describes this as ensuring that all of the projected light beam spots along the target surface are imaged on the line array detector in sharp focus. The one-dimensional line array detector has detecting elements, that is, pixels, disposed along the detector in a one-dimensional array. The pixels are elongated in a direction perpendicular to the longitudinal axis of the array. Cielo et al teaches using a wide aperture array, that is, an array having significantly elongated pixels (2.5 mm×15 $\mu$m with 25 $\mu$m spacing) in the line array detector so that the light beam spots, preferably having elliptically shaped cross sections, are imaged within the aperture of the array.

Cielo et al also teaches that the signal amplitude generated by a light spot hitting adjacent pixels in the photo-detector array, if plotted as signal amplitude versus position along the array, is a pulse having a gaussian distribution. Cielo et al further teaches that the position on the array of each light beam spot image must be located very precisely in order to obtain a good depth accuracy, that is, an accurate distance measurement from the sensor to the target surface whose profile is being mapped. In particular, Cielo et al teaches locating the centre of each pulse using an algorithm for determining what he refers to as the centre of gravity of the pulse. The centroid algorithm is as follows:

$$\mu avg = [\Sigma_i \mu_i I(\mu_i)] / [\Sigma_i I(\mu_i)]$$

where $\mu_i$ is the position of the i-th element along the array detector and $I(\mu_i)$ is the amplitude of the signal detected by this element, while $\Sigma$ is a summation symbol. The centre of gravity computed according to this formula corresponds to the point of maximum signal amplitude of the pulse if the pulse is in fact gaussian, that is, smooth and symmetrical.

Cielo et al recognize however that the shape of such pulses may vary considerably because of speckle and thus a centroid approximation algorithm will not necessarily accurately estimate the position on the array of the maximum signal amplitude of the pulse. Accurately estimating the position of the pulse centroid allows for accurate mapping of the target surface. Cielo et al obtain what they describe as a smooth and constant pulse shape by their combination of a wide aperture array with an elliptically shaped light beam spot imaged as a focussed spot on the array. This allows averaging of the random fluctuations of a number of speckles within each pixel comprising the laser spot image.

The draw back of such a system is that a wide aperture array is required and the alignment of the light beams must be sufficiently accurate to place the imaged light beam spot fully onto the array in order that the stimulated pixels generate sufficient output signal strength to overcome the increased detector background noise associated with wide aperture arrays. Wide aperture arrays are also typically more costly and are slower to scan than conventional one-dimensional arrays having significantly smaller apertures.

Nosler, U.S. Pat. No. 4,248,532 which issued Feb. 3, 1981 for an Electro-optical Distance Measuring System also teaches that it is desirable that the light beam imaged spot on the array be in focus. Nosler discloses a triangulation based electro-optical sensor, similar in underlying principal to that taught by Cielo et al, to measure the position of, and thereby to map, the profile of the surface of logs being moved past the electro-optical distance measuring device. A laser beam is projected onto a log surface and the image of the beam reflection imaged by a lens onto a linear photo-detector array. The location of the image on the array is indicative of the distance to the log surface.

It is disclosed by Nosler that measuring logs requires a dynamic measurement range of between 8 inches and 48 inches and that it is desired to maximize the resolution accuracy of the reflected image so that such accuracy does not vary over the entire dynamic range. Nosler teaches that the angular positioning of the photo-detector array is critical to ensuring that throughout the dynamic range the reflected image on the array will always be in sharp focus. Nosler states that changes in focus of the image on the detector array will cause significant resolution accuracy differences.

In order that the reflected image on the array always be in sharp focus, Nosler teaches intersecting the axis of the light beam (which coincides in the Nosler device with the object plane of the device) with the interception point of the principal axis of the lens and the longitudinal axis of the photo-detector array so that all three axes intersect at one point, referred to by Nosler as the "known point". Intersection of all three axes at the known point also satisfies, as does impliedly the Cielo device (see FIG. 2), the Scheimpflug condition for focusing images of a reflected light beam onto a surface such as that of the photo-detector array. For a description of the Scheimpflug condition see for example: Scheimpflug, T(1906), 'Der Photoperspektograph und seine Anwendung', Photographische Korrespondenz 43, 516; Brown, N(1969), 'Slit Image Photography', Trans. Ophthal. Soc., 89, 397; G. Bickel, G. Hausler, and M. Maul, "Triangulation with expanded range of depth", Opt. Eng. 24(6), 975–977(1985).

The Scheimpflug condition is an approximation based on the assumption that the lens being used to focus the reflected image onto the photo-detector array surface may be modelled as a thin lens. That is, an assumption is made that the thickness of the lens element is small enough so that the effect of the lens thickness on the accuracy of the calculation of the known point may be neglected. For the purpose of such a thin lens approximation, the thickness of the lens is assumed to be zero. The principal points of the lens are thus assumed to be coincident. The principle plane of a thin lens is the plane which is normal to the optical axis of the lens and intersects the principal point which is on this same axis. The position of this plane at which it, the light beam axis and the longitudinal axis of the array intersect at a known point defines an orientation which satisfies the Scheimpflug condition. If it is assumed then, using the thin lens approximation, that the primary and secondary principal plane of the lens may be taken as coincident then that coincident plane or a chosen single reference plane, where it intersects the light beam axis and the longitudinal axis of the array locates the known point and satisfies the Scheimpflug condition.

Real lenses such as used in the present invention and such as are used in triangulation based electro-optical distance measuring devices of which the applicant is aware, have finite thicknesses and thus primary and secondary principal points, separated by known distances. For the purpose of comparing the characteristics of a real or thick lens with respect to the Scheimpflug condition, the terms primary and secondary planes have been used to define planes which are normal to the optical axis and intersect the primary and secondary principal points, respectively If the geometry of such a device is aligned to form a known point and thus satisfy the Scheimpflug condition, for example, by having the secondary principal plane intersect the point of intersection of the light beam axis with the longitudinal axis of the detector array, then it is only an approximation to state, as does Nosler, that focus is maintained over what Nosler refers to as the dynamic range. Such an approximation ignores the higher order effects of a real lens.

The reliance by Cielo et al and Nosier on the concept of focus is an oversimplification. That is, it is not only the focus achieved by a geometric alignment satisfying the Scheimpflug condition, in applications of which the present invention is one, that govern the resolution accuracy of a photodetection array in a triangulation based distance measuring device. Instead of "focus" per se, it is array output signal optimization which is desirable in devices using real lenses and conventional non-wide aperture photo-detector arrays such as the EG&G Reticon™ array, model number RL 1024DAG-020. Array output signal optimization means optimizing the signal to noise ratio from the array and optimizing the array resolution accuracy, i.e. the accuracy with which the centroid of a pulse may be located.

Concentrating solely on focus by strictly adhering to the Scheimpflug condition ignores other factors affecting array output signal optimization, vis:

(a) light beam intensity profile;

(b) saturation of pixel output;

(c) number of pixels covered by the light beam image;

(d) standoff distance;

(e) target range; and, (f) laser power setting.

In what follows then, the "focus" position or known point refers to an alignment whereby the secondary principal lens plane intersects the intersection point of the light beam axis and the longitudinal axis of the photo-detector array. Alignments other than those satisfying the Scheimpflug condition are referred to as "de-focused". Thus, for example, translating the position of the lens along the lens axis so as to move the secondary principal plane off the known point is referred to as defocusing the lens.

Suzuki U.S. Pat. No. 4,575,237 describes a sub-pixel interpolation methodology for improving the distance measuring resolution of a triangulation based ranging device consisting of a source, collection lens, detector and processing electronics. The Suzuki method improved upon the prior art methods by converting the light level signals of a linear array of light detection elements into relative magnitudes. This resulted in a sampled light intensity distribution signal of the light incident on the array, that could be processed by electronic circuitry. The Suzuki method was based on fitting a curve to this sampled light intensity distribution and calculating the location of the peak of this curve. As a result, it was possible to interpolate between elements to a level greater than the ½ element level achieved in the prior art and thus improve the distance measurement of the device.

Since the Suzuki patent was based on detection of the extrema of a fitted curve, Suzuki was required to use at least a second order curve to fit to the data. In order to define a specific curve, the 3 coefficients a, b and c had to be determined. This required 3 x,y coordinates in order to generate the 3 equations necessary to solve for the 3 unknown coefficients. As a result, the method of Suzuki required the relative magnitude of at least 3 elements, in order to determine the coefficients of the quadratic curve and then the x,y coordinate of the peak of this function. As a result, the reference in column 4, lines 21–22 of the Suzuki reference where he mentions the need "to allow light intensity distributions 13 and 14 to have suitable extents of width" refers to the fact that Suzuki required the light level of at least 3 pixels to make a measurement of the peak. This criteria determined "the focus positions and the aberration correcting states of the light beam projecting and light receiving optical systems of the light measuring device". It did not means that the device was to be defocused, just that the point of focus was to be placed so that the beam of light was wide enough at the array to cover 3 pixels. Suzuki at all times assumed the use of a focused device. This is emphasized by Suzuki in the first full paragraph of column 2 of that reference, where defocus is identified as being detrimental, along with other factors associated with getting the reflected light to impinge at least 3 light sensitive elements such as reduction in the light receiving area of each light sensitive element, with its associated decrease in quantity of light. Thus Suzuki points away from defocus being a desirable attribute in a distance measuring device for optimizing output. Rather, defocus is relegated to a necessary evil, once to be avoided, but one which may be necessary to obtain sufficient image width for interpolation according to the Suzuki method.

The 3 element criteria of the Suzuki method is also illustrated in Figure in that both curves 13 and 14 are approximately 3.5 elements wide and would thus yield the coordinates necessary to determine the coefficients of a quadratic function.

The only criteria that Suzuki mentions is "suitable extents of width" which he indicates in the patent disclosure (column 3, line 63 to column 4, line 17 and in FIG. 3) to be 3 array elements.

Applicant notes that the Suzuki patent makes no mention in optimizing the optical configuration of his distance measurement system of:

(a) defocusing the major optical elements to a near-Scheimpflug condition to achieve optimization according to the present invention; and (b) the specific manner of defocusing (i.e. defocusing the lens by moving the lens along the optical axis) to achieve specific optimized characteristics according to specific criteria.

For example, the lens is defocused so as to optimize the output signal according to the following criteria:

1. approximate as closely as possible to a Gaussian distribution the intensity profile of the image impinging the pixel array;
2. maximize the amplitude of the intensity profile of the output signal of the array;
3. minimize the saturation of the pixels in the array; and
4. optimize the width of the image, normally within a range of the number of pixels between 10 and 35. With reference to criteria #1, Suzuki makes no references to a Gaussian distribution. Referring to criteria #2, Suzuki makes no mention of maximizing the image amplitude so as to utilize the full dynamic range of the detector elements. In fact, referring to FIG. 3, Suzuki provides examples of 2 acceptable signals labelled 13 and 14 where signal 14 has a peak amplitude that is 50% of that signal 13. This shows a lack of understanding of the importance of signal amplitude on sub-pixel resolution. Referring to criteria #3, again Suzuki makes no mention of signal level relative to element saturation level and thus did not recognize the importance of utilizing the full dynamic range of the detector array elements and the contribution of maximizing signal amplitude while minimizing pixel saturation in improving sub-pixel resolution. It is clear that although Suzuki may have been able to improve the sub-pixel resolution over the crude ranging devices in the prior art, his optical alignment criteria lacks the inventive aspects particularly pointed out and distinctly claimed in the present claims.

Referring to criteria #4, Suzuki's 3 pixel recommendation differs significantly from the 10 to 35 pixel recommendation outlined in the present application.

It is an object of the present invention consequently to provide a method and apparatus for optimizing the alignment of the three principal components, namely, the light source, the lens, and the photo-detector array, and for optimizing the output signal from the photo-detector array across the target range of interest.

SUMMARY OF THE INVENTION

An apparatus for optimizing sub-pixel resolution in a triangulation based distance measuring device at desired stand-off distances has the following basic components:

(a) a laser light source for projecting a light beam along a light beam axis so as to project a light spot onto a surface of a workpiece;

(b) a lens having an optical axis and a depth of focus dependant on the target distance, the lens for gathering reflected light from the light spot on the surface of the workpiece;

(c) a linear photodetector array of adjacent light detecting pixels, the array having a longitudinal array axis, the array for detecting light impinging the pixels and generating an output signal indicative of the position of the pixels being impinged by the light, wherein the lens images the reflected light across the array of pixels so as to form an image impinging on the pixel array. The output signal from the array is indicative of the intensity profile of the image where it impinges the array. The image is defocussed so as to optimize the output signal from the array. Movement of the surface of the workpiece relative to the distance measuring device while the light spot is projected onto the surface of the workpiece causes corresponding movement of the image along the pixel array.

For a pre-selected range of distances, that is, for a distance range between a desired stand-off distance and the surface of the workpiece, the output signal from the array may be optimized by fixing the location of the lens relative to the array at an optimized defocused location describing a near-Scheimpflug condition. That is, the output signal may be optimized by fixing the distance between the lens and the array along the optical axis so as to:

(1) approximate as closely as possible to a gaussian distribution the intensity profile of the image impinging the pixel array;

(2) optimize the width of the image, normally within a range of the number of pixels between 10 and 35;

(3) maximize the amplitude of the intensity profile of the output signal of the array; and, (4) minimize the saturation of the pixels in the array. Advantageously the optimized defocused location is within 20% of the lens' focused location, where such a percentage is defined as the distance between the optimized defocused location and the focused location relative to the depth of focus of the lens at a desired stand-off distance.

Ordinarily the light beam axis, the optical axis, and the longitudinal axis of the array are co-planar. In this configuration, the image plane of the array and the lens plane are coincident. However, the output signal of the array may be further optimized by laterally off-setting the array relative to the lens and lens plane so that the light beam axis, the optical axis and the longitudinal array axis are no longer co-planar. In this manner it is possible to impinge on the pixel array selected cross sections of the image, which cross sections correspond to an optimal area of image width and light intensity.

Further optimization is accomplished by skewing the array relative to the lens and lens plane so that the image plane and the lens plane diverge in the direction of movement of the image along the array as the distance within the distance range is decreased.

BRIEF DESCRIPTION OF THE DRAWINGS

FIG. 5b is a left side view of FIG. 5a.

FIG. 6b is a left side view of FIG. 6a.

FIG. 7b is a left side view of FIG. 7a.

FIG. 8b is a left side view of FIG. 8a.

FIG. 9b is a left side view of FIG. 9a.

FIG. 10b is, in perspective exploded view, the optical assembly housing of FIG. 10a.

FIG. 13a is a cross sectional view along line 13a—13a in FIG. 12a.

FIG. 13b is a cross sectional view along line 13b—13b in FIG. 12,

FIG. 13c is a cross sectional view along line 13c—13c in FIG. 12.

FIG. 13d is a cross sectional view along line 13d—13d in FIG. 12a.

FIG. 13e is a cross sectional view along line 13e—13e in FIG. 12a.

DETAILED DESCRIPTION OF PREFERRED EMBODIMENTS

Figure 1:
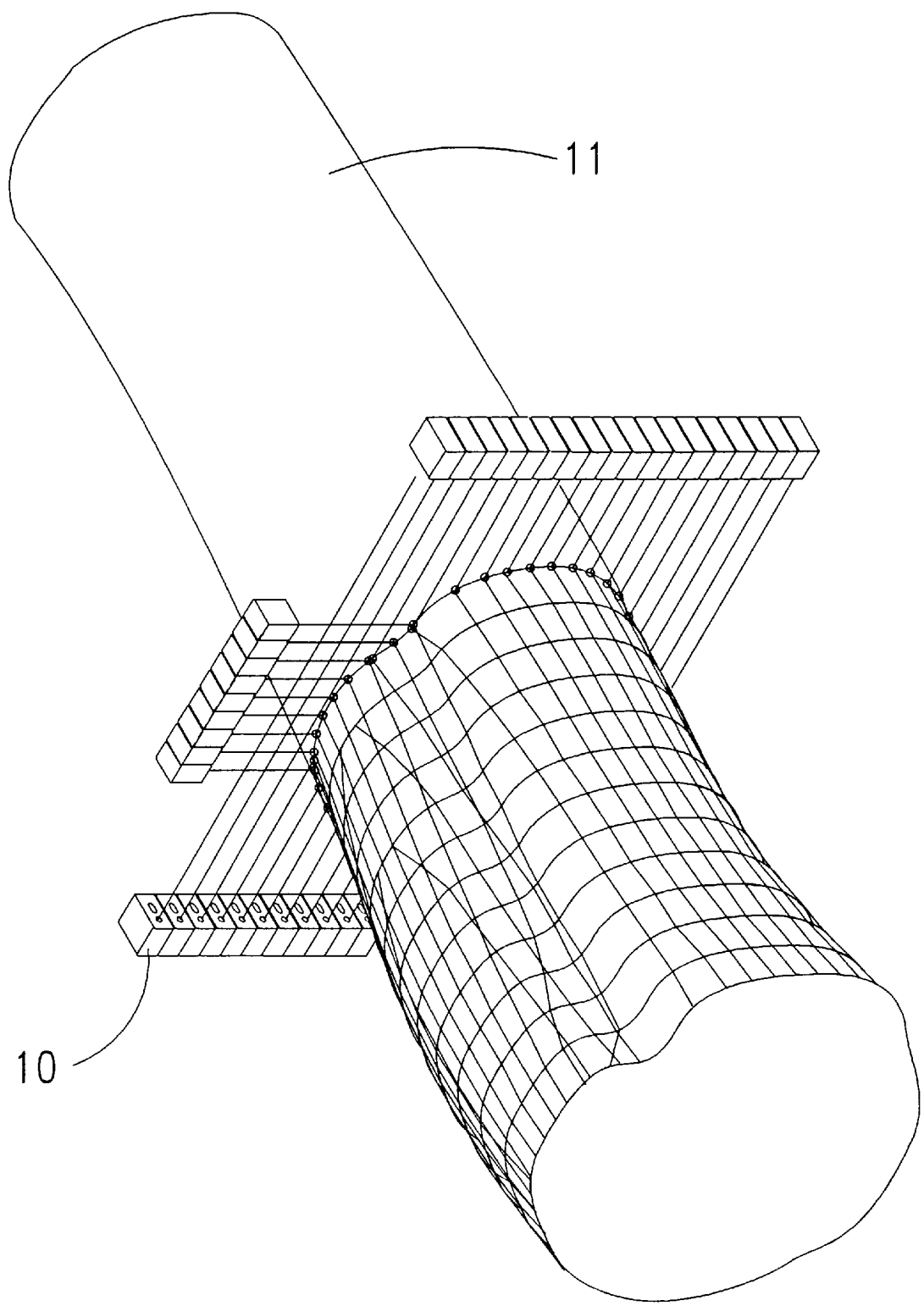
FIG. 1 is, in perspective view, an arrangement of devices incorporating the present invention arranged to map the surface profile of a log.

FIG. 1 is an overview of a distance measuring system incorporating the present invention. In particular, each of the triangulation based distance measuring devices 10 incorporates the three basic elements of the device illustrated simplistically in FIG. 2. Devices 10 are in close array to achieve the scan density depicted on the mapped outline of log 11. Log 11 is moved past the arrays of devices 10.

Figure 2:
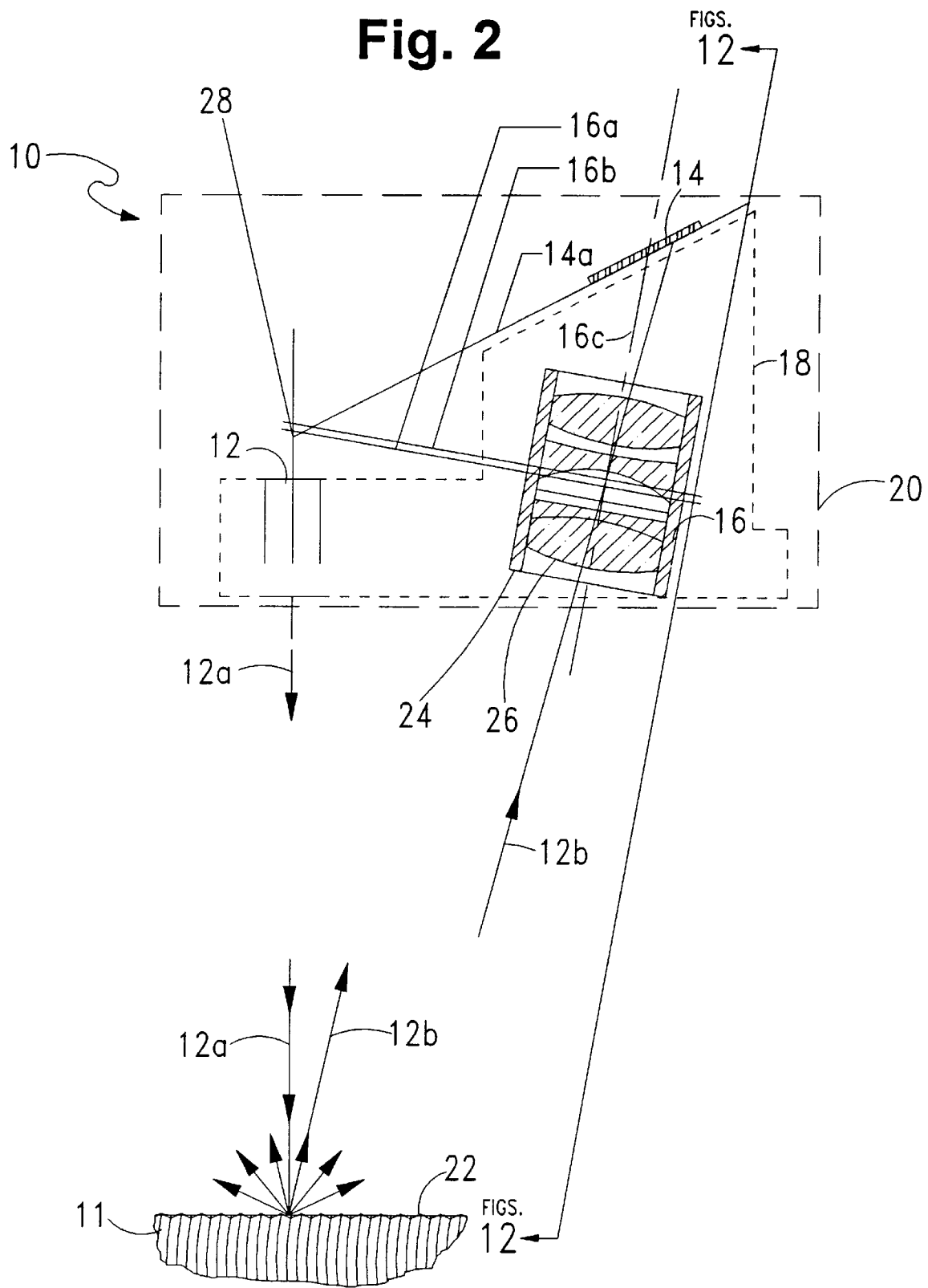
FIG. 2 is, in side elevation view, a schematic of the basic elements of the present invention.

The three basic elements of devices 10, as depicted in FIG. 2, are laser light source 12, linear photodetector detector array 14 and lens 16. Laser light source 12 has associated light beam axis 12a. Linear photodetector array 14 has associated longitudinal photodetector array axis 14a. Lens 16 has associated primary principal plane 16a, secondary principle plane 16b, and lens axis 16c.

Figure 10A:
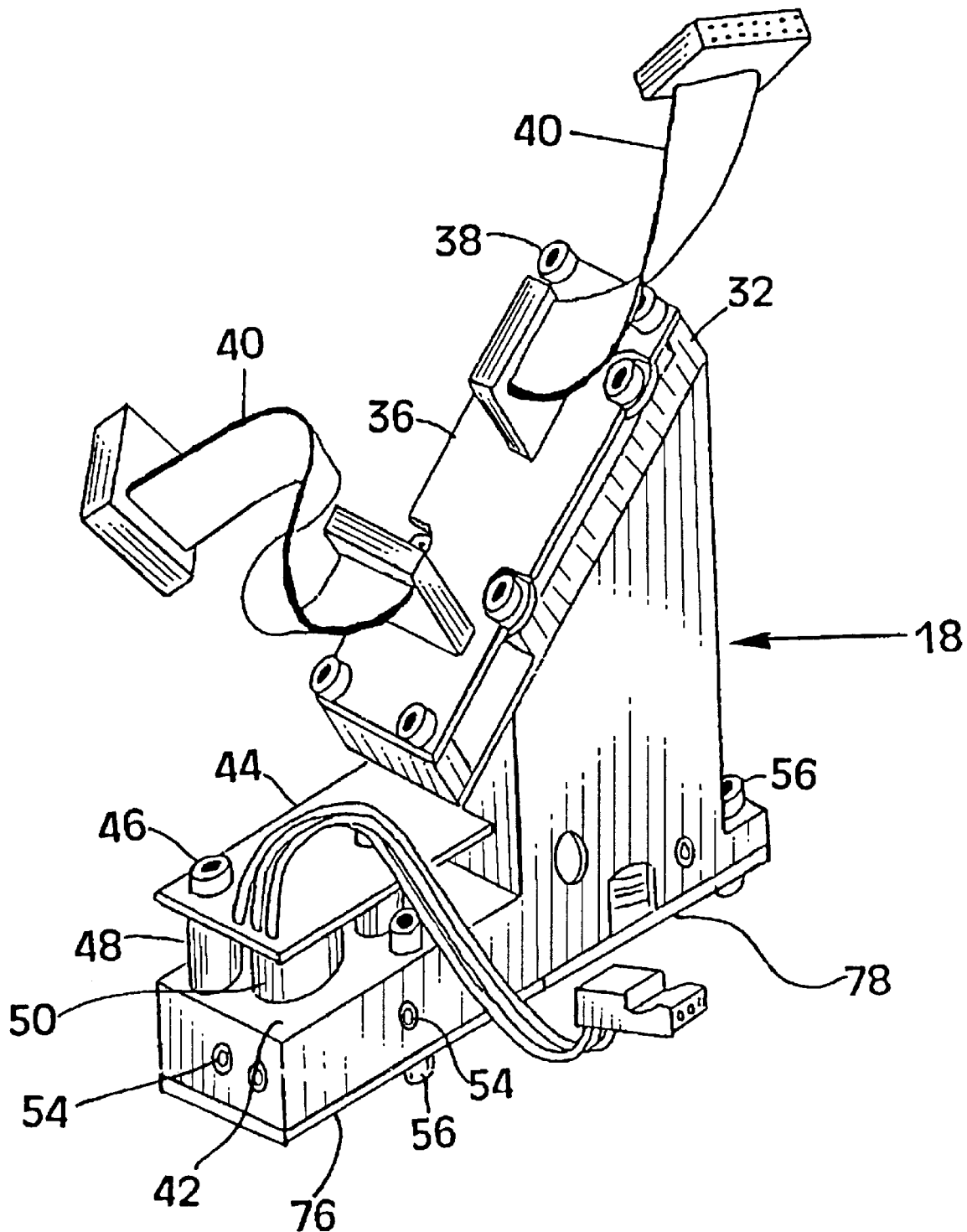
FIG. 10a is a perspective view of an optical assembly housing incorporating the present invention.
Figure 10B:
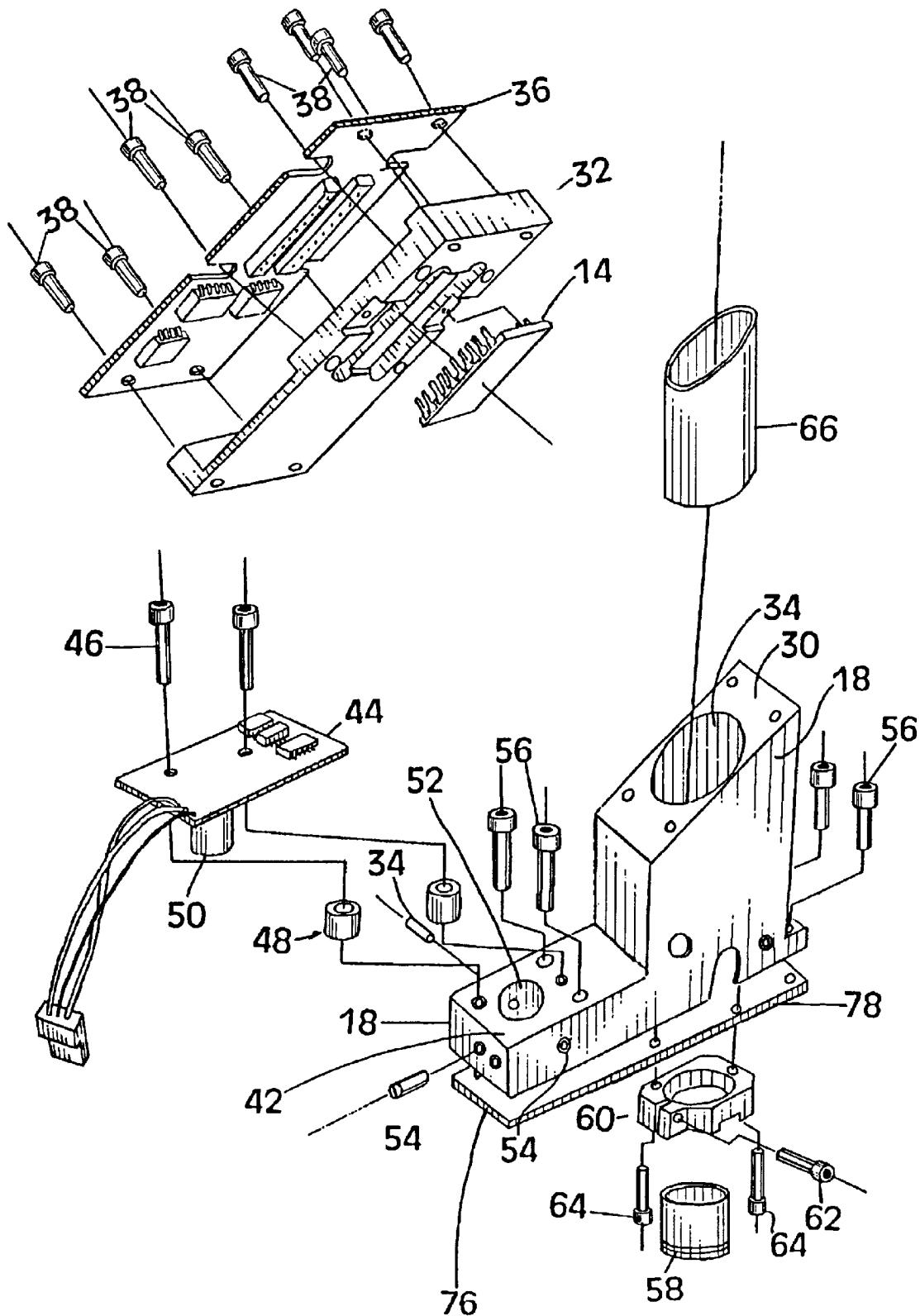

Optical housing 18, shown in broken outline and better illustrated in FIGS. 10a and 10b, serves to support laser light source 12, linear photodetector array 14, and lens 16 in the geometry illustrated in FIG. 2. Optical housing 18, shown in FIG. 2 schematically in broken outline, is contained within outer housing 20, also shown in broken outline.

Log 11 has diffuse or partially specular reflecting target surface 22. Coherent light from laser light source 12 travelling along light beam axis 12a is diffusely reflected from target surface 22. Reflected light from target surface 22 is gathered by lens 16 and imaged onto photo detector array 14. The image plane of array 14 is normal to the face of the array and contains longitudinal array axis 14a.

Figure 3:
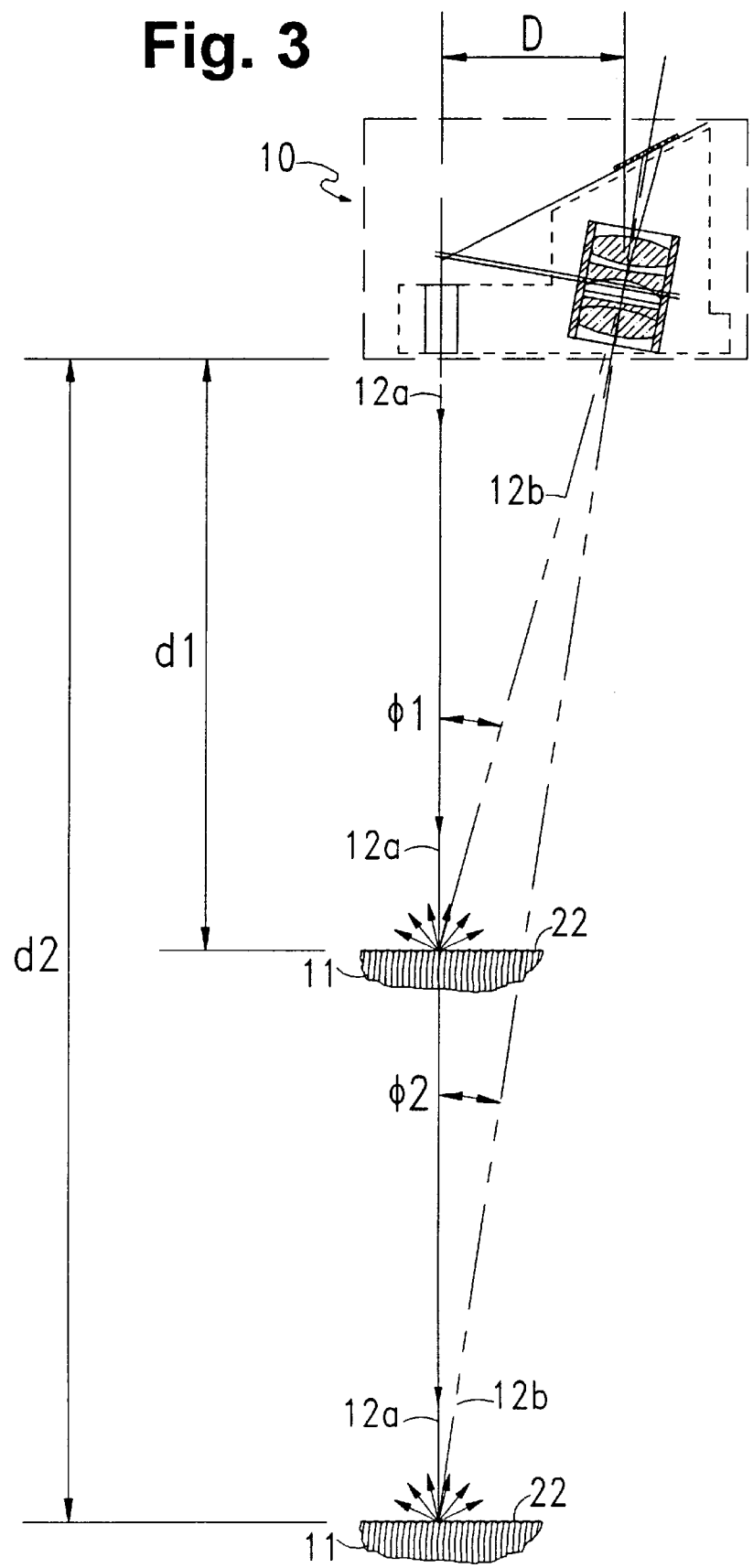
FIG. 3 is a diagram of the geometry of FIG. 2.

The basic trigonometry, wherein the variables are depicted in FIG. 3, is as follows:

a) Stand-off Distance $d_1 = D/\tan(\phi_1)$;

b) Distance $d_2 = D/\tan(\phi_2)$;

c) Target Range $= d_2 - d_1 = D(1/\tan\phi_2 - 1/\tan\phi_1)$, where D is the distance perpendicular from light beam axis 12a to the centroid along array axis 14a of an imaged light beam spot imaged on photo detector array 14 within device 10, and where $\phi_1$ is the angle between light beam axis 12a and reflected light beam axis 12b when target surface 22 is at stand-off distance $d_1$ from measuring device 10, and where $\phi_2$ is the angle between light beam axis 12a and reflected light beam axis 12b when target surface 22 is at distance $d_2$ from measuring device 10. The target range over which it is desired to optimize sub-pixel resolution is the difference between distance $d_2$ and $d_1$.

In order to accurately determine the target position, it is necessary to accurately locate the centroid of the light beam spot falling on a photo detector array 14 with respect to a known calibrated reference position.

A typical linear photo detector array is Model No. RL1024DAG-020 manufactured by EG & G Reticon™ of Sunnyvale, Calif., U.S. This type of photo detector array has 1024 square pixels, 13 μm on side, arranged in a linear side-by-side array.

A typical laser light source is a continuous wave semiconductor laser, ANSI Standard Z-136.1, Class 3B, typically infrared, having a wavelength of 780 nm with a spot size of approximately 1.0 mm×3.3 mm. Such semiconductor lasers are manufactured by, among others, Melles Griot, of Denver, Colorado, United States (for example, Model No. 56DLB104), and by Philips Consumer Electronics BV of Eindhoven, Netherlands (for example, Model No. CQL30).

As set out above, optimizing the output signal of array 14 involves other factors than merely compliance with the Scheimpflug condition, namely:

(a) light beam intensity profile;

(b) saturation of pixel output;

(c) number of pixels covered by the light beam image;

(d) stand-off distance;

(e) target range; and, (f) laser power setting.

Figure 4:
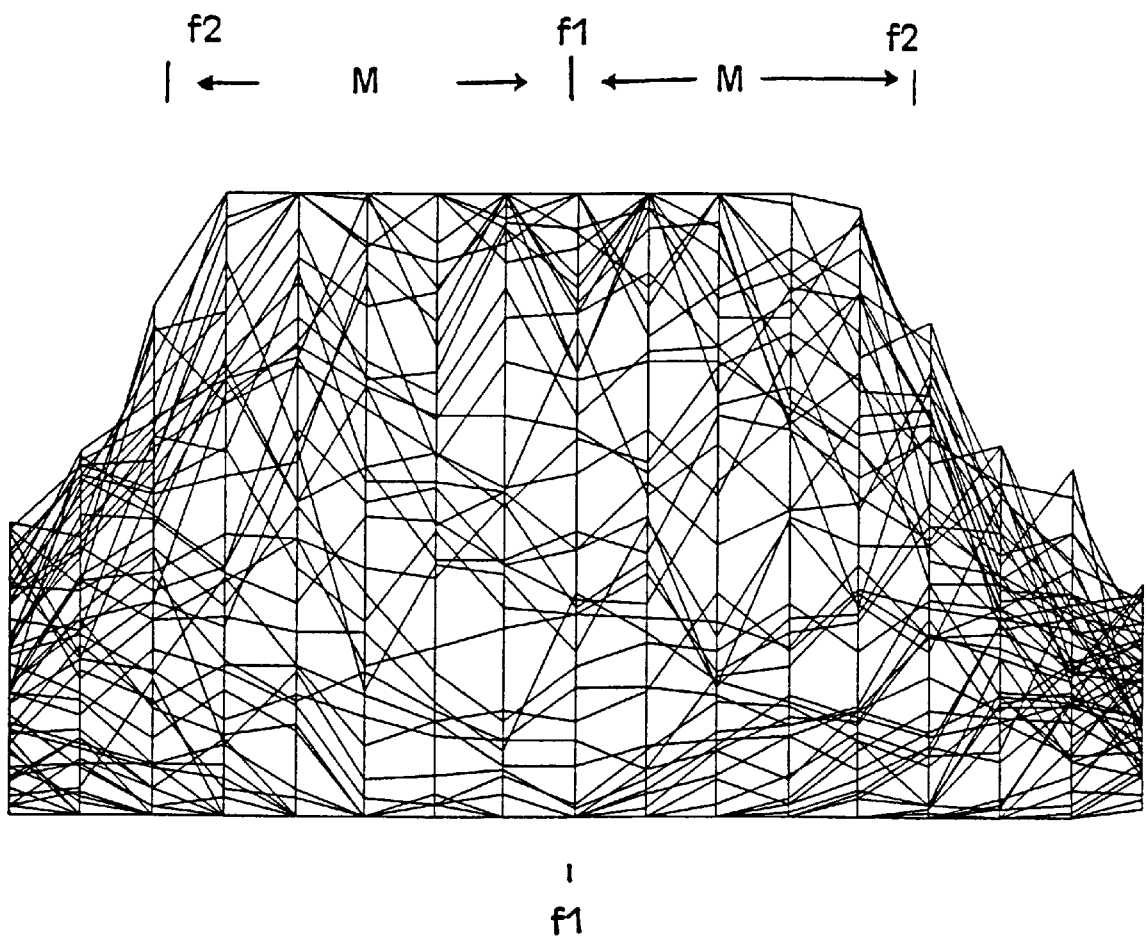
FIG. 4 is an illustration of maximum range of lens movement for optimized defocusing according to the present invention.

Set out in Table 1 below are the results of five tests in which defocus and laser power were varied so as to optimize the output signal of array 14 for increasing stand-off distance. The amount of defocus is expressed as a percentage. The percentage is calculated as the distance the secondary principal lens plane is translated away from satisfying the Scheimpflug condition, calculated as the distance plane 16b moves along axis 16c away from a reference plane parallel to plane 16b which intersects the known point 28, divided by the maximum distance under any condition, determined by experiment, that lens 16 could be defocussed and still provide an optimal signal output from array 14. This maximum distance is indicated as distance M in FIG. 4, which is a plot showing maximum signal output amplitude versus lens position relative to the lens focused position. Distance M approximates the distance from focus point $f_1$ (the point at which the Scheimpflug condition is approximately satisfied) to the point of maximum optimized defocus $f_2$ on either side of focus point $f_1$. The points of maximum optimized defocus $f_2$ were established where the signal amplitude exceeded approximately 80% of maximum possible amplitude at the nearest stand-off distance of the target range of interest. The illustrated increments in FIG. 4 represent defocussing the lens in 0.25 mm increments at a stand-off distance of 7 inches. Distance M was calculated to be 1.375 mm at this stand-off distance and 0.9 mm, 0.5 mm and 0.3 mm at stand-off distances of 15 inches, 25 inches and 30 inches, respectively. These maximum defocus numbers are used to calculate the amount of defocus for each target range as outlined in Table 1.

The laser power is expressed in percentage of maximum power available, which in the case of the Melles Griot Model No. 56DLB104 used in these experiments is 3.1 milliwatts.

The stand-off distance was 7 inches in test 1, increasing in test 2, 3, and 4 to 15, 25 and 30 inches, respectively. As set out in Table 1, the desired target ranges (expressed in inches and inclusive of stand-off distance) were as follows: from 7 to 10 inches (i.e. 3 inches from stand-off distance) for test 1, 15 to 20 inches for test 2, 25 to 30 inches for test 3, 30 to 35 inches for test 4, and a full range test 7 to 36 inches for test 5. The optimized configuration for the desired target ranges were obtained by translating target surface 22 on a test bench away from device 10 and visually inspecting the corresponding pulse shape and amplitude on an oscilloscope at various target locations throughout the measurement range. In this way the laser image characteristics throughout the target range are considered in the optimization procedure. For a particular target range of between say 7 and 10 inches, the actual 256 shade greyscale image of the laser was stored in a computer, at 0.5 inch increments. Thus seven different samples were taken into consideration when optimizing the configuration for a desired target range of 7–10 inches. Each of these was stored in vector form where each vector element represented a particular pixel and the value of each element the pixel amplitude using the 256 shade greyscale. For each of these vectors a new sub-vector was created which centered the image within the sub-vector. These equal element sub-vectors were then concatenated to form a single submatrix, with each row represented a pixel relative to the center of the image. By taking the average greyscale value for each row, an average image for the target range of interest was obtained. The average image for various setup parameters was then compared to establish the optimal settings, for a particular target range.

In optimizing the output signal shape and amplitude, it was found desirable to have a pulse width between 10 and 35 pixels, an average signal strength (i.e. amplitude) of as close to 100% as possible, and a shape approximating a gaussian distribution. A 100% signal strength indicated the maximum output of the stimulated pixels. Thus, light intensities corresponding to signal amplitudes greater than 100% could not be measured as the pixels were saturated and no matter what greater light intensity reflected onto the stimulated pixels, no greater electrical output was generated by the pixels. It was thus desirable to avoid saturating the array pixels. If saturated, the pulse centroid location approximated by the sub-pixel interpolation algorithm set out below (hereinafter the "centroid algorithm") was likely more inaccurate than if the pixels were outputting signals at or near 100% amplitude.

Defocusing the lens reduced intensity profile irregularities, that is, tended to smooth the pulse shape into a shape closer resembling a gaussian distribution. It was found not desirable to have too few or too many pixels in the pulse width, i.e. an image width which was either too small or too large.

With respect to the image width being too small; the centroid algorithm allows locating the centroid of a given image pulse with a resolution of less than the width of a pixel (i.e. sub-pixel resolution). The centroid algorithm requires at least 2 pixels to resolve to a sub-pixel level. The level of sub-pixel interpolation is dependent on the resolution of the system used to acquire the image. The conversion of continuous signals to discrete signals causes rounding or truncation errors. These are often referred to as quantization errors. It was found by modelling of these errors that for a given image shape, the quantization errors are at a maximum at 2 pixels and reduce to a minimum at 5 pixels and then gradually increase (somewhat irregularly) with increasing numbers of pixels.

However, there is another significant source of error in any real triangulation sensor which is caused by thresholding. In order to eliminate ambient or background noise from the video camera image (i.e. from array 14), signals below a certain threshold are ignored. As a result, the lower part of the gaussian image is truncated and thus not considered in the centroid calculation. The amount of truncation is generally kept to a minimum. The reflected image of the laser spot moves along array 14 as target 22 is moved. The pixels on the side of the image pulse corresponding to the direction of image motion will be moving upward towards saturation and those on the other side downwards towards the truncation threshold. It happens that the number of pixels above the threshold on either side of the centroid can vary by one pixel, as the image spot moves along a localized area of array 14. This change in pixel numbers causes discontinuities in the centroid versus target distance function used to calculate the distance to target surface 22 and thus degrades the linearity of the sensor. The relative magnitude of these discontinuities decreases as the image width increases. It has been found that these effects are insignificant at image pulse widths of 10 pixels or greater.

With respect to the image width being too large; the quantization error increase at higher image widths mentioned above is one reason for limiting the width of the image pulse. However, the change in image shape is more significant. Given that the vertical scale of the image pulse is fixed by the saturation level of array 14, widening the gaussian image tends to reduce the average image slope magnitude of the pulse. The average slope magnitude is calculated by summing the magnitude of the difference in amplitude of adjacent pixels of a particular image. A high average slope magnitude will result in a high degree of image shift resolution. Defocusing an image also tends to flatten the image and thus reduce the average slope magnitude. It has been found that the average slope magnitude becomes unacceptably low at image widths greater than 35 pixels.

A typical centroid algorithm for calculating sub-pixel resolution is represented by the following:

$$Centroid = \Sigma_i i V_i / \Sigma_i V_i$$

where the variables are defined as follows:
 i=index representing pixel number
 $V_i$=amplitude of the $i^{th}$ pixel.

TABLE 1

OPTIMIZATION TESTS

| | Test No. | | | | |
|---|---|---|---|---|---|
| | 1 | 2 | 3 | 4 | 5 |
| Stand-off distance (inches) | 7 | 15 | 25 | 30 | 7 |
| Optimization for target range of (inches) | 7–10 | 15–20 | 25–30 | 30–35 | 7–36 |
| Dynamic target range (inches) | 3 | 5 | 5 | 5 | 29 |
| Ratio of stand-off distance to dynamic target range (SO-/DTR) | 2.3 | 3 | 5 | 6 | 0.24 |
| Amount of defocus when optimized (% away from focus) | 13.8% | 15.6% | 10.9% | 10% | 14.5% |
| Laser power (% of max available) | 31% | 30% | 37% | 53% | 82% |
| Average signal strength (amplitude) when optimized (% of max @ saturation) | 98% | 88% | 94% | 88% | 98% |
| Average max pulse width (number of pixels) | 23 | 13 | 10 | 9 | 31 |
| Corresponding figure numbers | FIG. 5 | FIG. 6 | FIG. 7 | FIG. 8 | FIG. 9 |

Figure 5A:
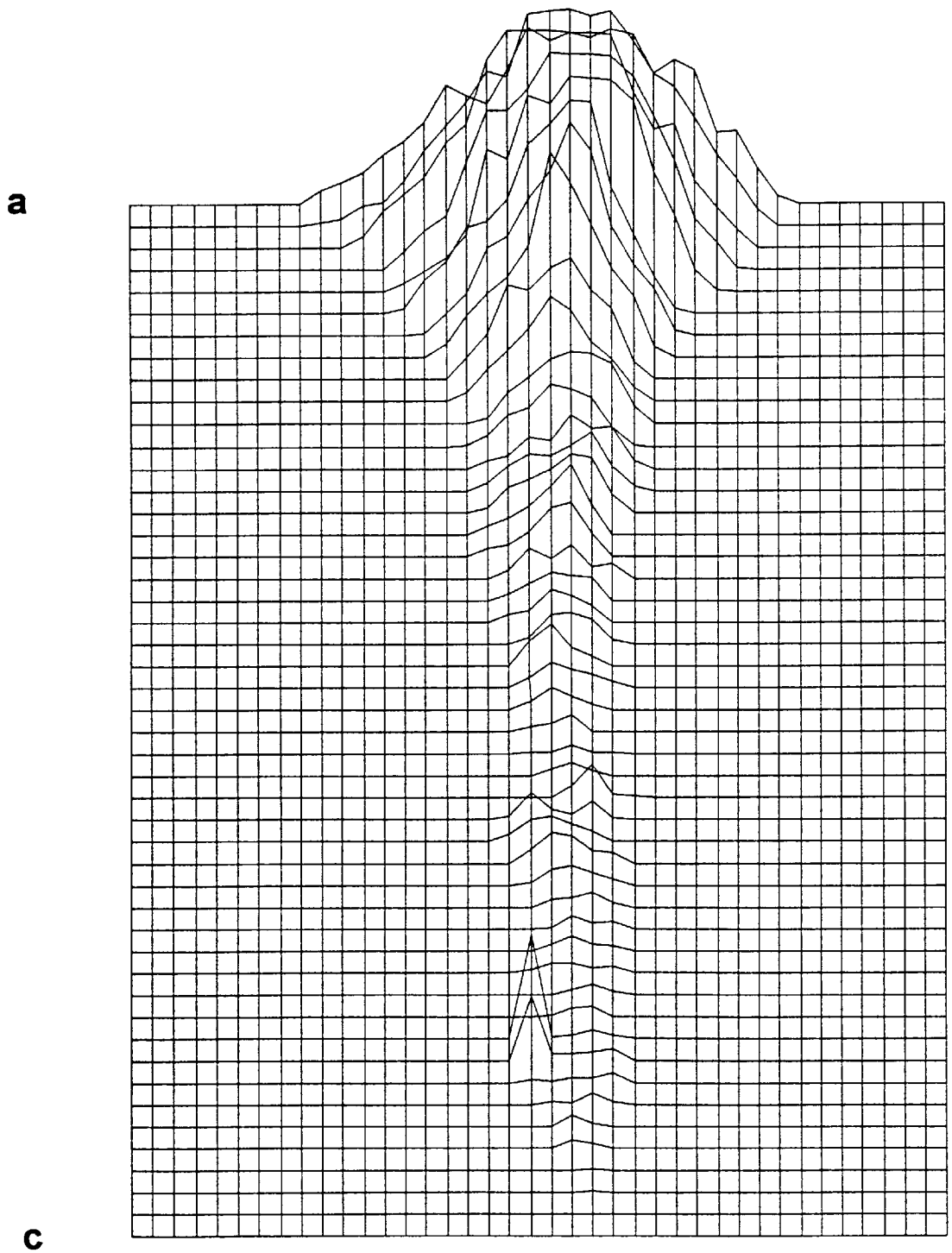
FIG. 5a is a 3 dimensional plot showing shape and amplitude of array output signal as a function of target range, optimized for a target range between 7 and 10 inches.
Figure 5B:
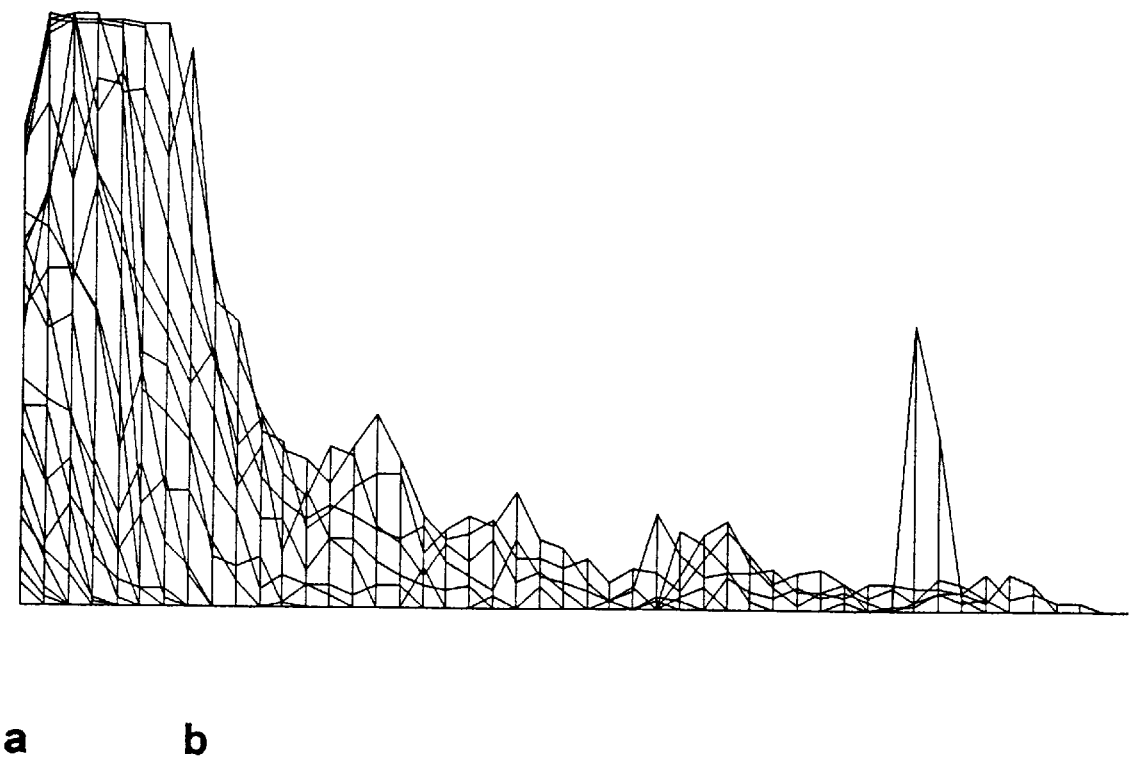
Figure 5C:
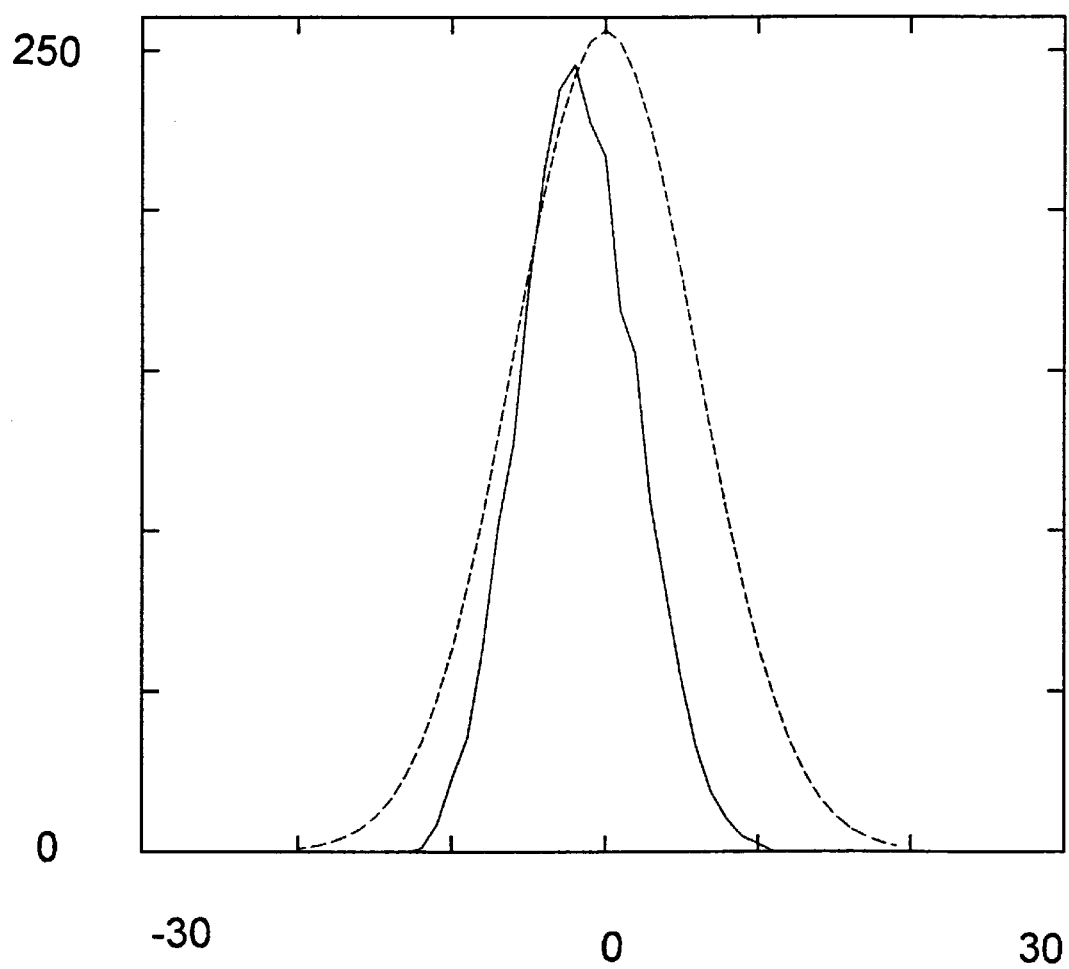
FIG. 5c illustrates a standard gaussian profile and contains a plot of average pulse amplitude and width over a target range between 7 and 10 inches.

The results of test 1, summarized in Table 1, are illustrated in FIGS. 5a, 5b and 5c. FIG. 5a is a three-dimensional plot showing shape and amplitude of the output signal (i.e. pulse) from array 14 as a function of target range, optimized for a target range between 7 and 10 inches, where position "a" indicates an initial target range distance, in this case 7 inches, and position "b" a cut-off target range distance, in this case 10 inches (located by counting in half inch increments from "a" to "b"). It is illustrated over the full target test range of 7 to 36 inches for sake of consistency of illustration between tests, where position "c" indicates a target range distance of 36 inches. Pixel saturation is illustrated as a flat surface truncating the top of the pulse shape. This may be better seen in FIG. 5b, which is a left-side view of FIG. 5a, where saturation of the pixels is clearly shown by the truncated top of the pulse at each half-inch increment between 7 and approximately 10.5 inches, indicated by position "c". FIG. 5c illustrates a plot of the average pulse amplitude and width over the desired stand-off distance and target range (i.e. between 7 and 10 inches), and consequently illustrates the average pulse shape of the array signal output optimized for a target range between 7 and 10 inches. A gaussian distribution is illustrated in outline for sake of comparison.

Figure 6A:
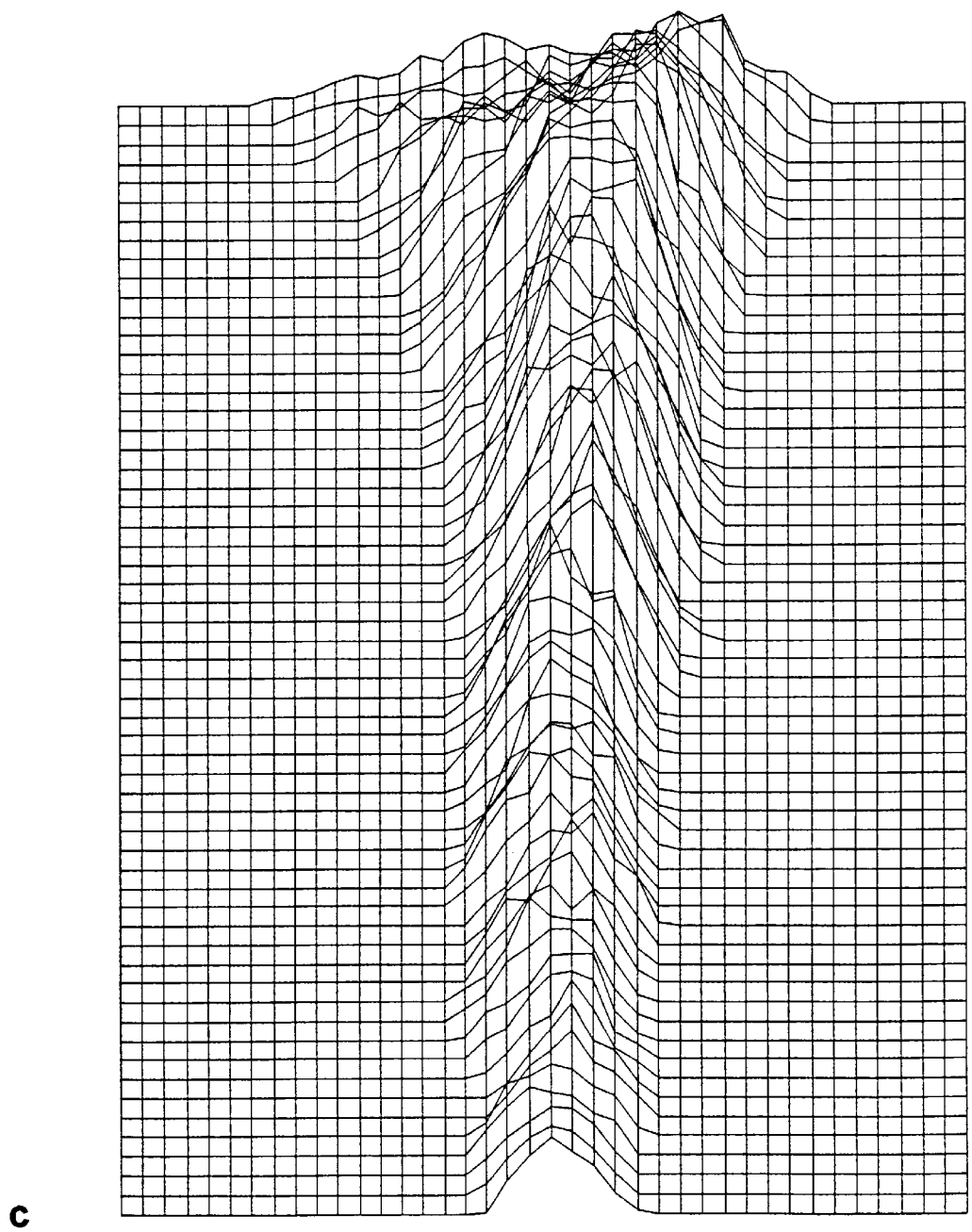
FIG. 6a is a 3 dimensional plot showing shape and amplitude of array output signal as a function of target range, optimized for a target range between 15 and 20 inches.
Figure 6B:
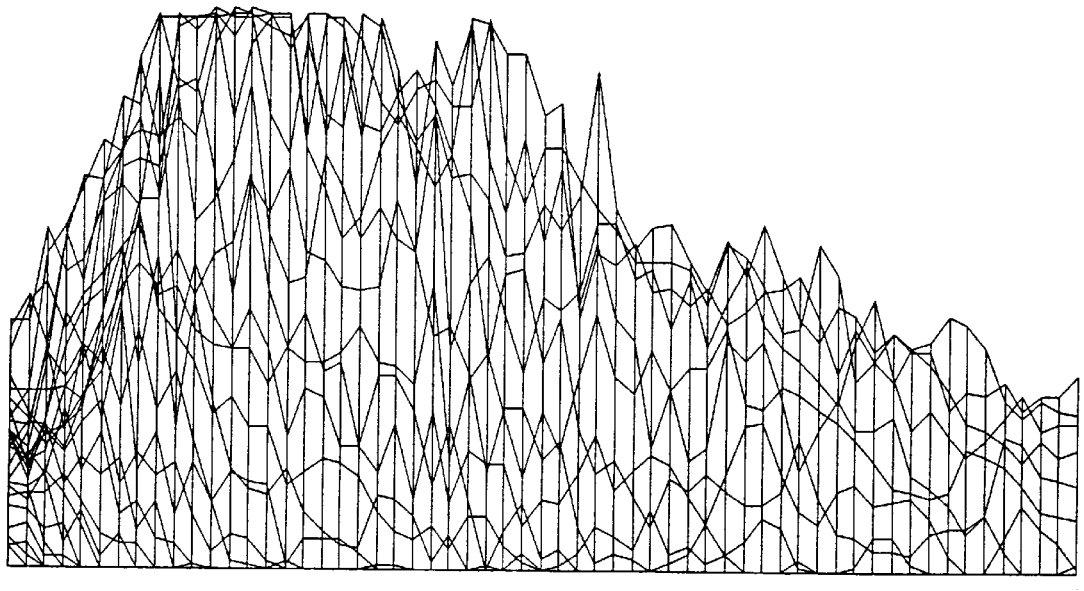
Figure 6C:
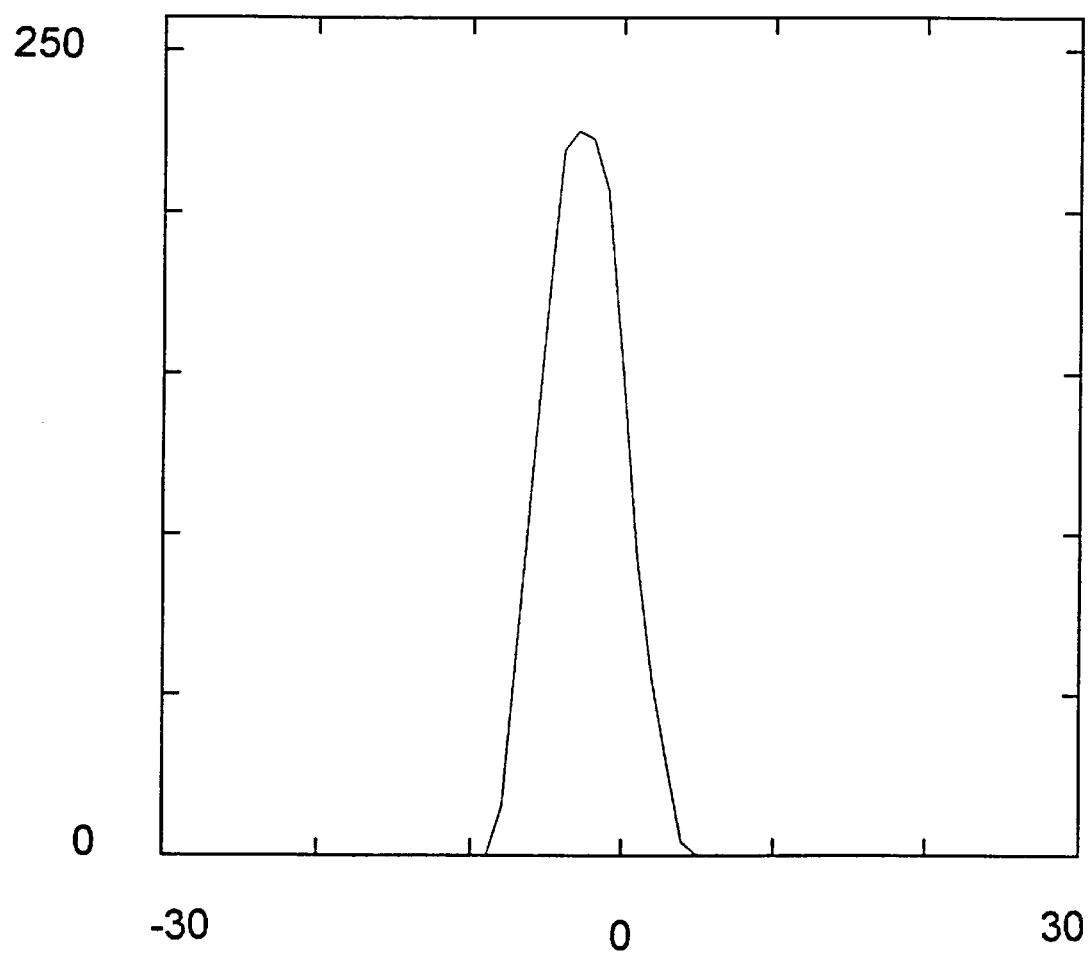
FIG. 6c is a plot of average pulse amplitude and width over a target range between 15 and 20 inches.
Figure 7A:
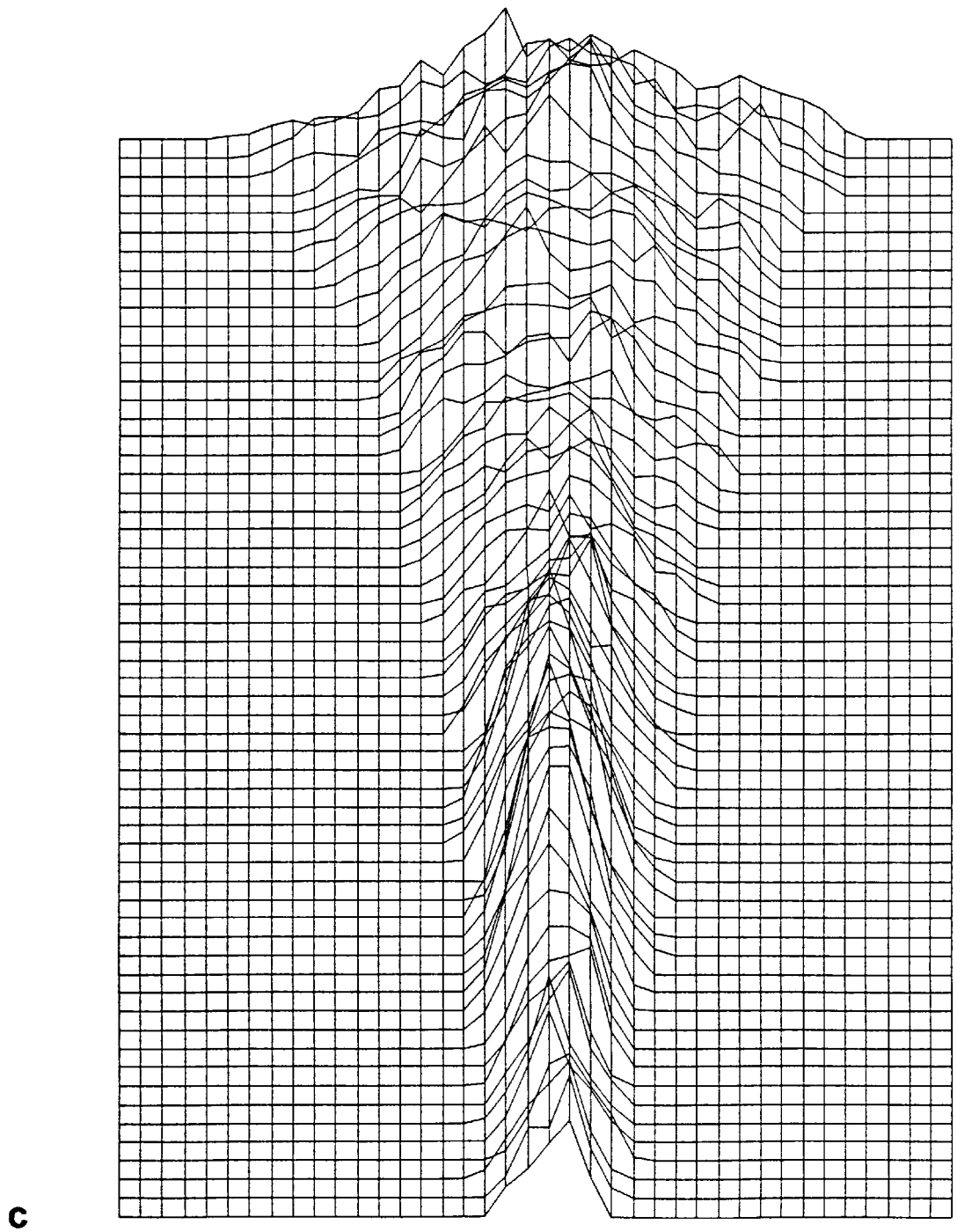
FIG. 7a is a 3 dimensional plot showing shape and amplitude of array output signal as a function of target range, optimized for a target range between 25 and 30 inches.
Figure 7B:
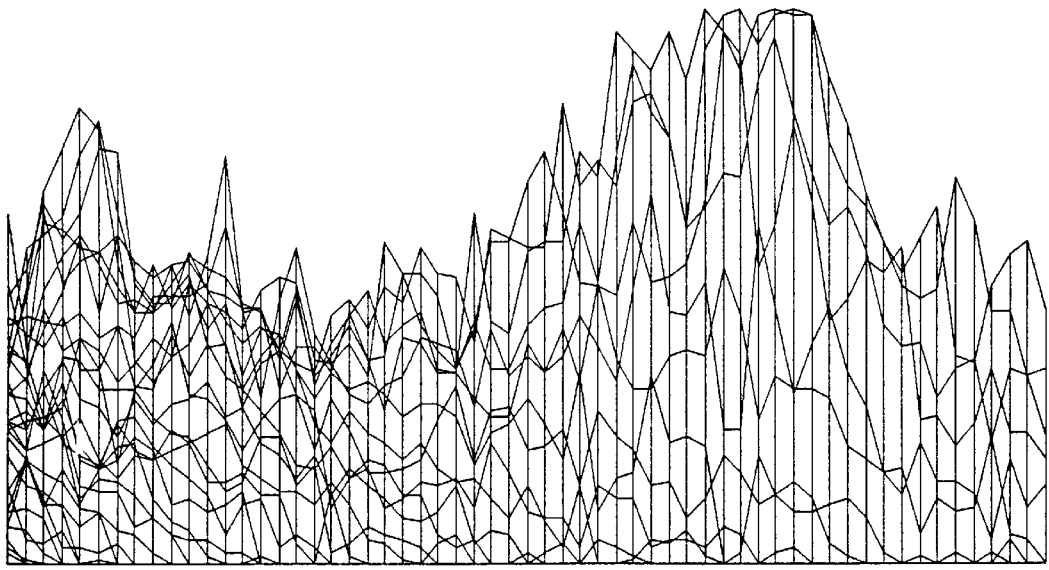
Figure 7C:
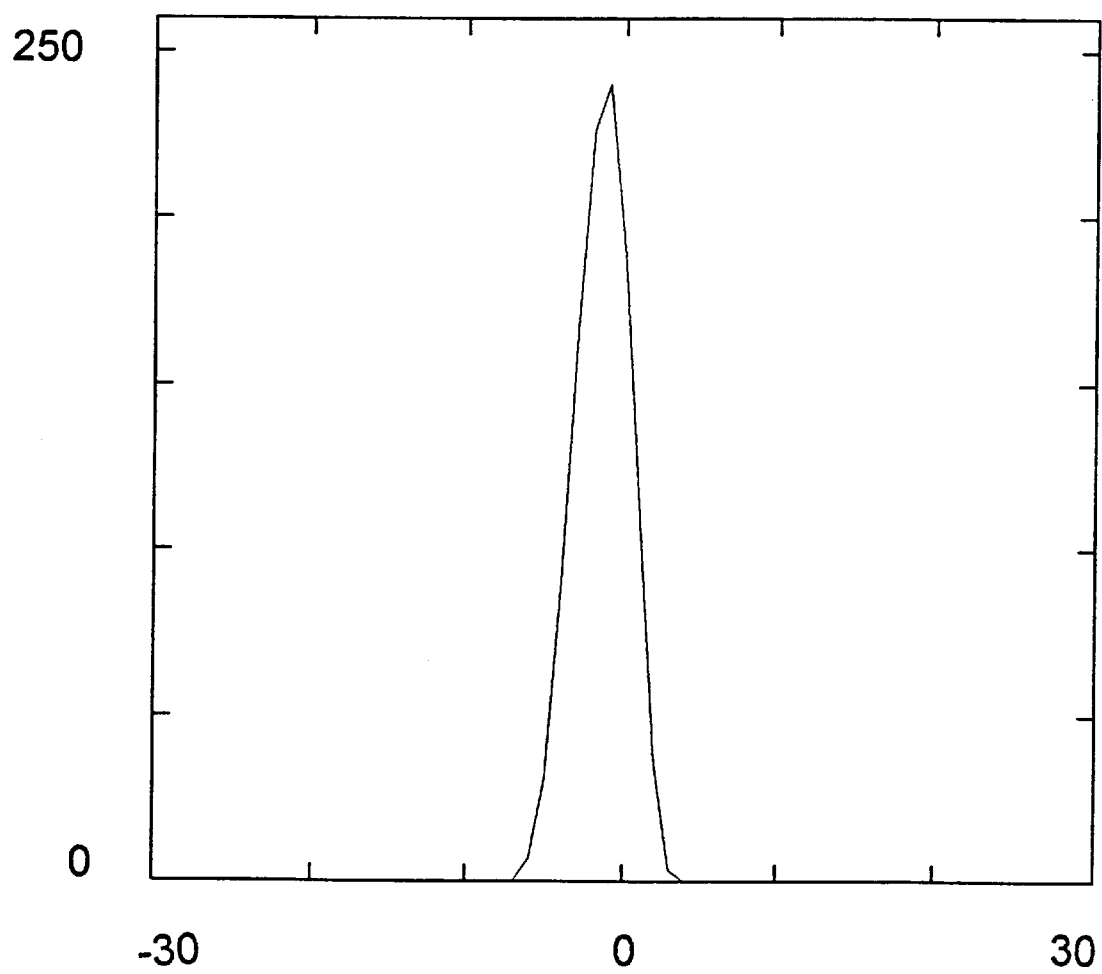
FIG. 7c is a plot of average pulse amplitude and width over a target range between 25 and 30 inches.
Figure 8A:
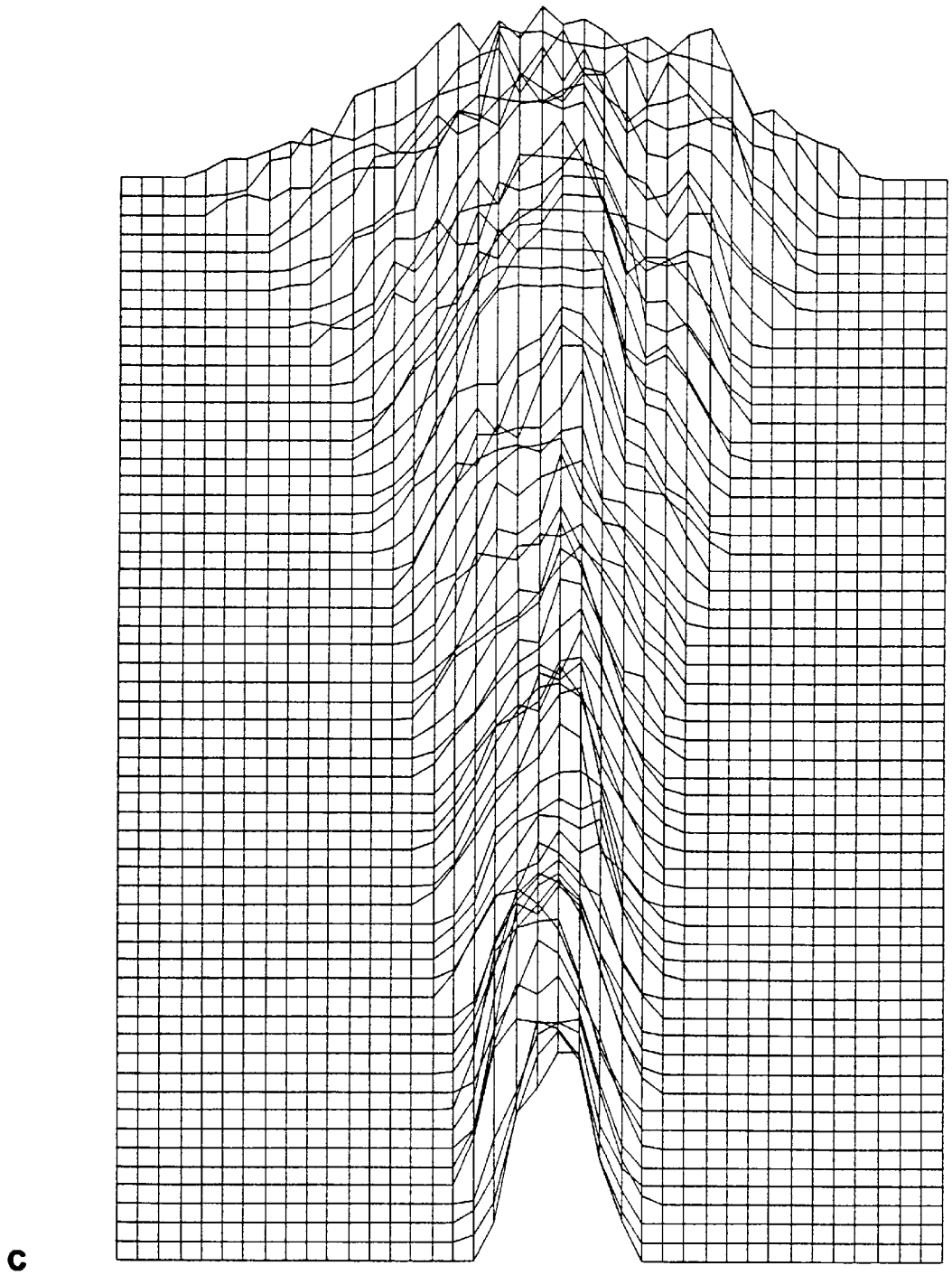
FIG. 8a is a 3 dimensional plot showing shape and amplitude of array output signal as a function of target range, optimized for a target range between 30 and 35 inches.
Figure 8B:
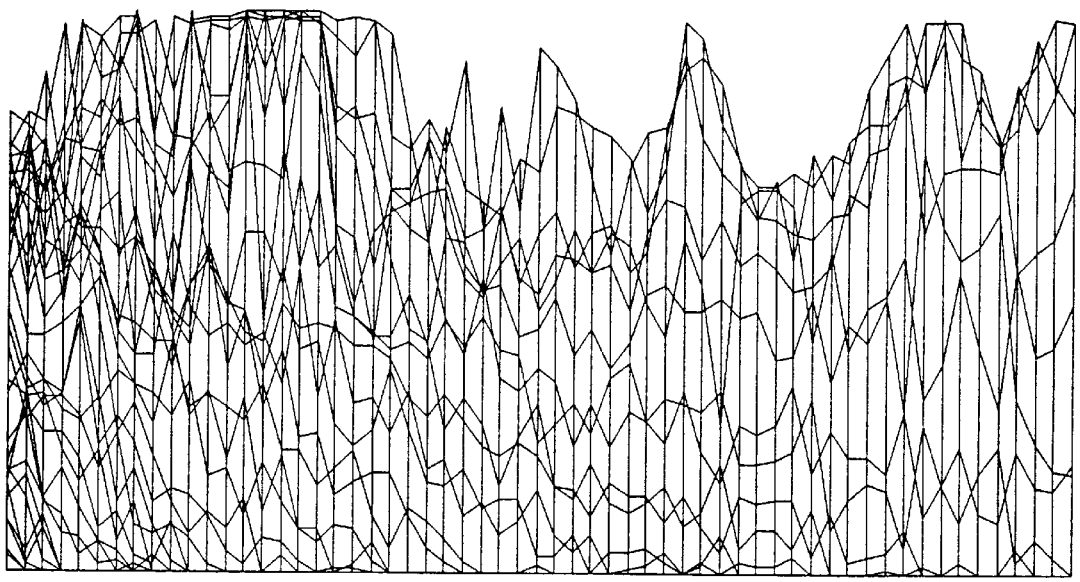
Figure 8C:
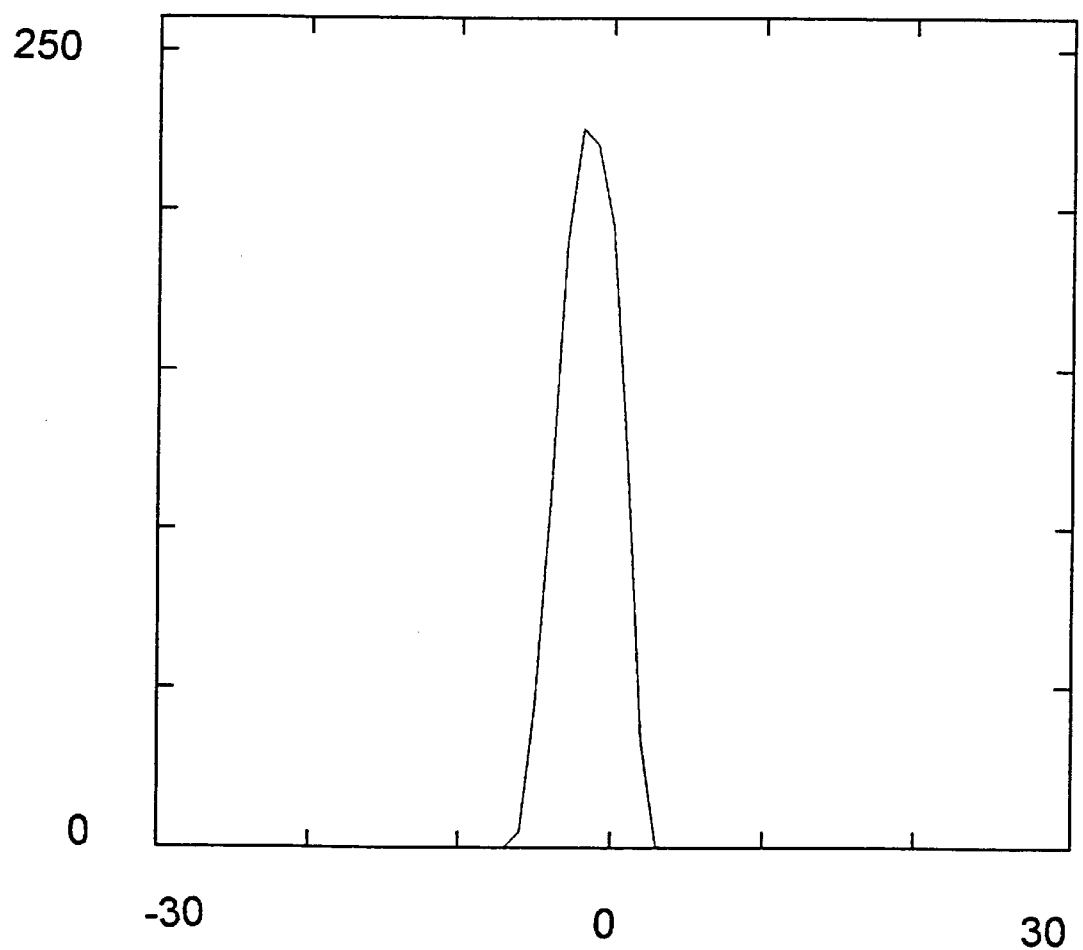
FIG. 8c is a plot of average pulse amplitude and width over a target range between 30 and 35 inches.

FIGS. 6a, 6b and 6c (corresponding to test 2), FIGS. 7a, 7b and 7c (corresponding to test 3), and FIGS. 8a, 8b, and 8c (corresponding to test 4), similar to FIGS. 5a, 5b and 5c illustrate, in the "a" figures, the pulse shape and amplitude in a three-dimensional plot, in the "b" figures, a left-side view of the three-dimensional plot, and, in the "c" figures, a plot of the average pulse shape (i.e. amplitude and width) optimized for increasing stand-off distances (target range constant). Tests 2, 3 and 4 were optimized for five inch target ranges, i.e. between positions "a" and "b" by maximizing within the target range the signal amplitudes while minimizing the pixel saturation and non-gaussian pulse shape.

As the stand-off distance was increased, the laser power had to be generally increased in order to provide the optimized signal amplitudes and maximum pulse width. It was found that for shorter stand-off distances, optimized signal output was obtained by defocusing the lens generally increasingly as the stand-off distance was shortened. The amount of defocus expressed as percentages in Table 1 were calculated by calculating the physical distance the lens was moved away from the Scheimpflug position (i.e. the image was focused) to obtain the optimized defocused position of the lens, and dividing that distance by the depth of focus (i.e., distance M, expressed in the same units of length) for the desired stand-off distance for that particular test.

Figure 9A:
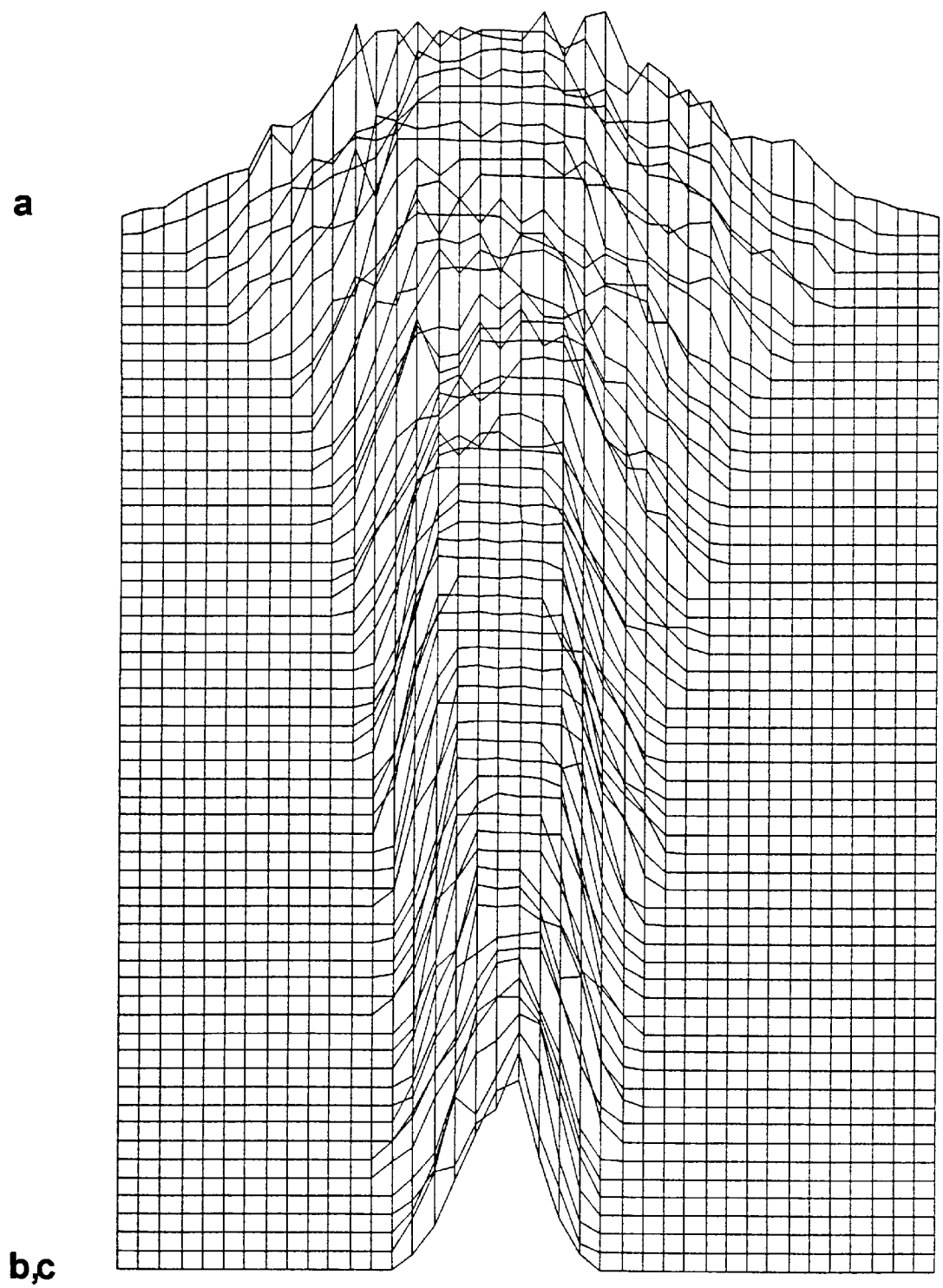
FIG. 9a is a 3 dimensional plot showing shape and amplitude of array output signal as a function of target range, optimized for a target range between 7 and 36 inches.
Figure 9B:
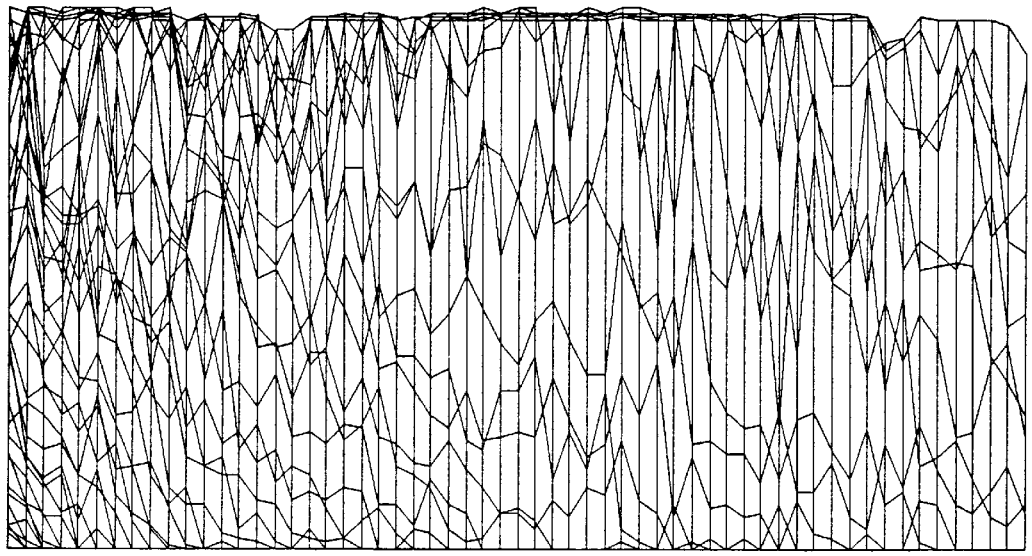
Figure 9C:
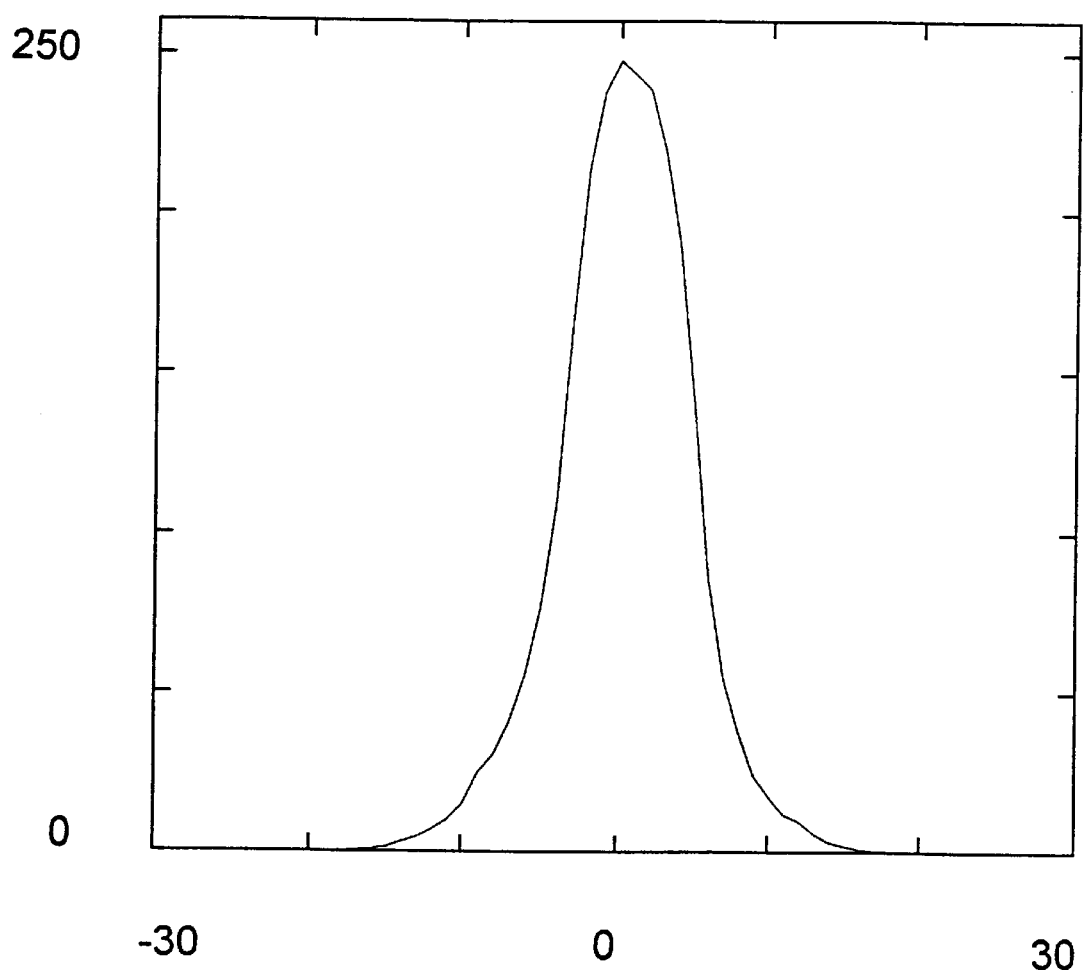
FIG. 9c is a plot of average pulse amplitude and width over a target range between 7 and 36 inches.

Further, as illustrated in test number 5, which sought to optimize the output over a broad target range of 7 to 36 inches, the optimized configuration occurred when the lens was significantly defocused. However, as illustrated in FIG. 9a and FIG. 9b, it was difficult to optimize the signal output over this broad target range as in order to do so resulted in significant pixel saturation, notably in the target ranges between 7 and 10 inches and between 15 and 25 inches. There was saturation of a significant number of adjacent pixels in array 14. As illustrated, it was not always possible to optimize the signal output at all locations across long target ranges. FIG. 9c, however, shows that overall the signal output was quite optimal.

FIGS. 10a and 10b show, respectively, optical assembly housing 18 in non-exploded and exploded views. Optical housing angled face 30 supports array mounting plate 32. Array mounting plate 32 supports linear photo-detector array 14 over lens barrel cavity 34. Array mounting plate 32 also supports backing plate 36. Bolts 38 secure backing plate 36 and array mounting plate 32 to optical housing angled face 30. Illustrated in FIG. 10a are connecting cables 40 for interfacing array 14 with the signal processing circuitry where centroids are calculated then connected to the external computer for information processing (not shown).

Optical housing non-angled face 42 supports the laser diode circuit board which also serves as supporting plate 44, secured to optical assembly housing 18 by bolts 46 and spacers 48. Laser diode 50 depends from supporting plate 44 into laser diode cavity 52. Screws 54 may be adjusted to align laser diode 50. Bolts 56 secure optical housing 18 to outer casing 20 (not shown).

Lens barrel 58 is secured within lens barrel cavity 34 by lens retaining bracket 60. Lens retaining bracket 60 is tightened onto lens barrel 58 by bolts 62 and secured to optical housing 18 by means of bolts 64. Lens barrel cavity light absorbing diffuse liner 66 is inserted into lens barrel cavity 34 between lens barrel 58 and photodetector array 14. The amount of defocus required in order to optimize the output signal of array 14 is adjusted by repositioning lens barrel 58 within lens barrel cavity 34.

Figure 11:
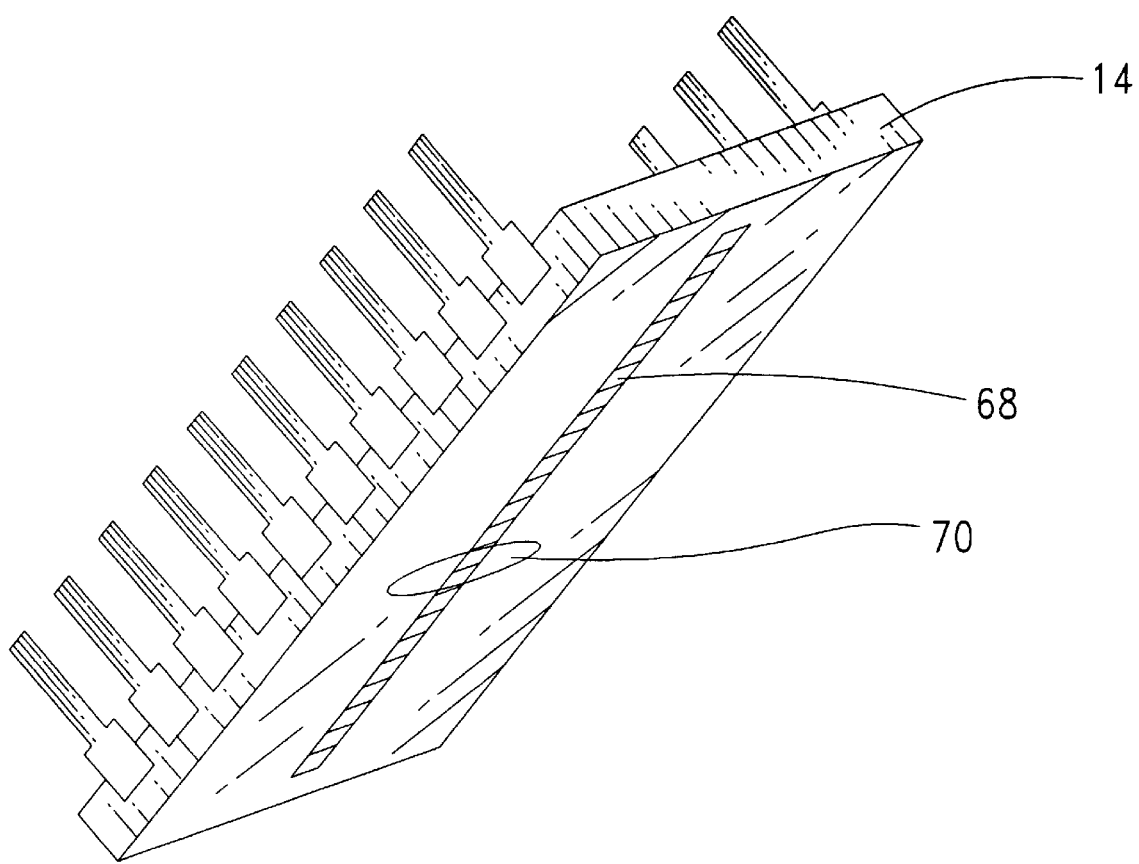
FIG. 11 is a perspective view of a linear photodetector array impinged by a light spot image.

FIG. 11 illustrates the arrangement of pixels 68 in array 14 (pixels 68 are not to scale). Also illustrated is a representation of the reflected image of a light spot, indicated as light spot image 70, overlaying pixels 68. As target surface 22 moves closer or further away from device 10, light spot image 70 moves along array 14 so as to cover different pixels 68.

Figure 12A:
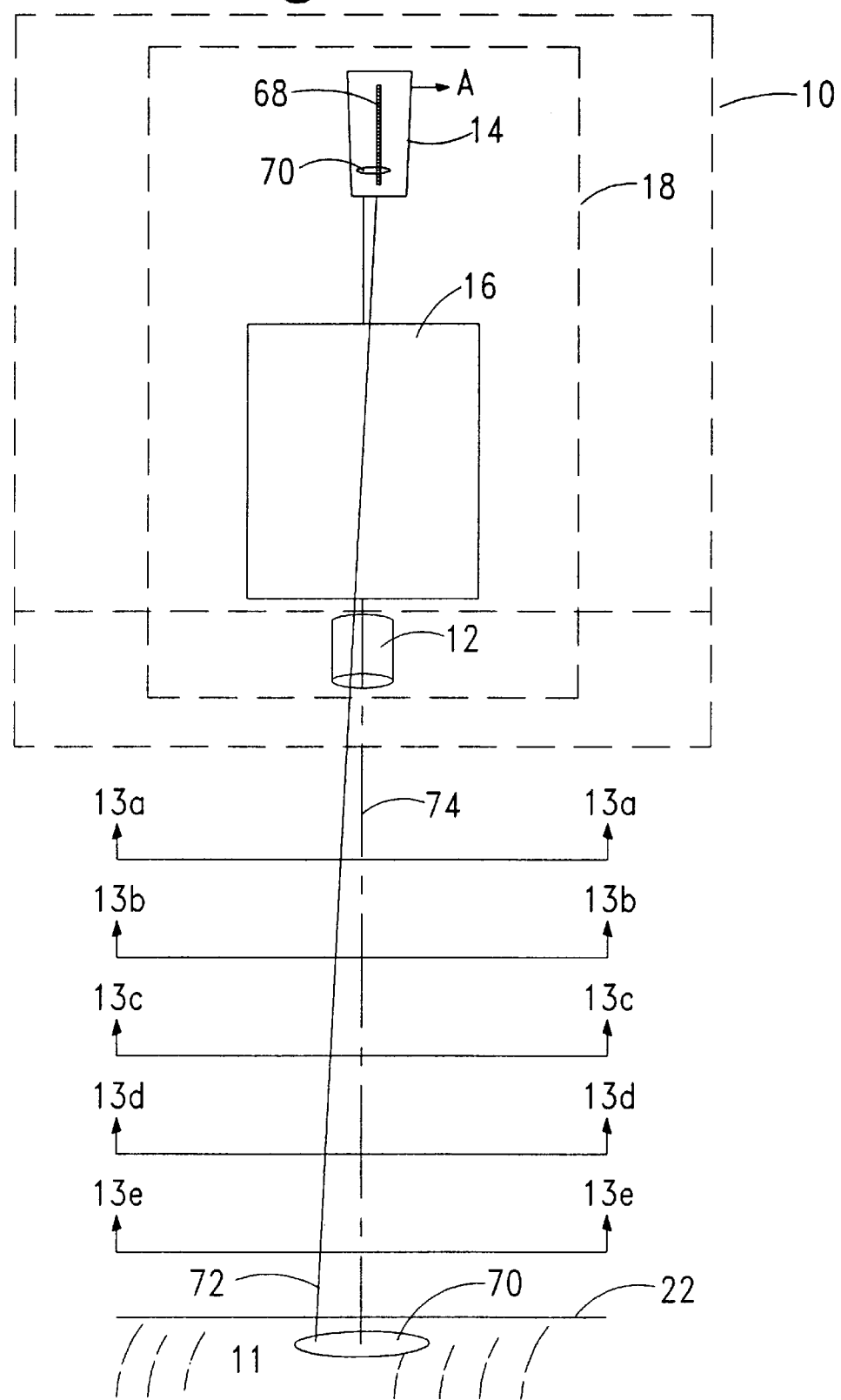
FIG. 12a is a cross sectional view along line 12—12 in FIG. 2 with photodetector array laterally offset.
Figure 12B:
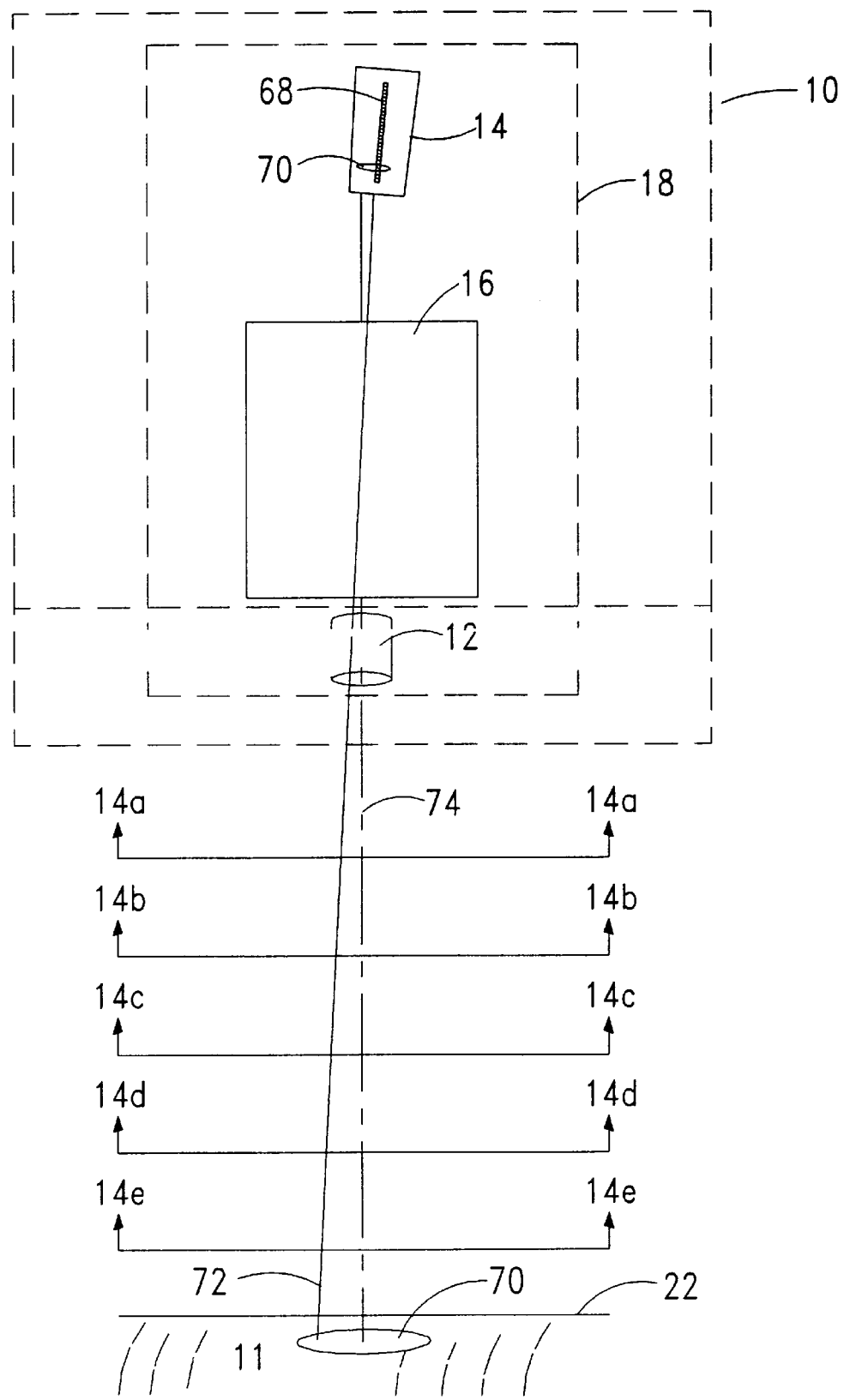
FIG. 12b is a cross sectional view along line 12—12 in FIG. 2 with photodetector array laterally offset and skewed.

It was found that if array 14 is offset relative to lens 16 as illustrated in FIG. 12a, then the image plane 72 of array 14 no longer coincides with lens plane 74 but rather diverges from lens plane 74 as the distance from device 10 increases. Depending on the amount that array 14 is offset relative to lens 16 and the distance that target surface 22 is from device 10, determines the lateral positioning of light spot 70 relative to pixels 68 and array axis 14a. The manner in which the offsetting illustrated in FIG. 12a and skewing of array 14 illustrated in FIG. 12b was implemented was by referencing and repositioning array mounting plate 32 relative to optical housing angled face 30. The holes in the array mounting plate 32 through which the bolts 38 were inserted to secure it to the optical housing angled face 30 were deliberately drilled large to allow for movement of the mounting plate 32 on the plane defined by the optical housing angled face 30.

Figure 15A:
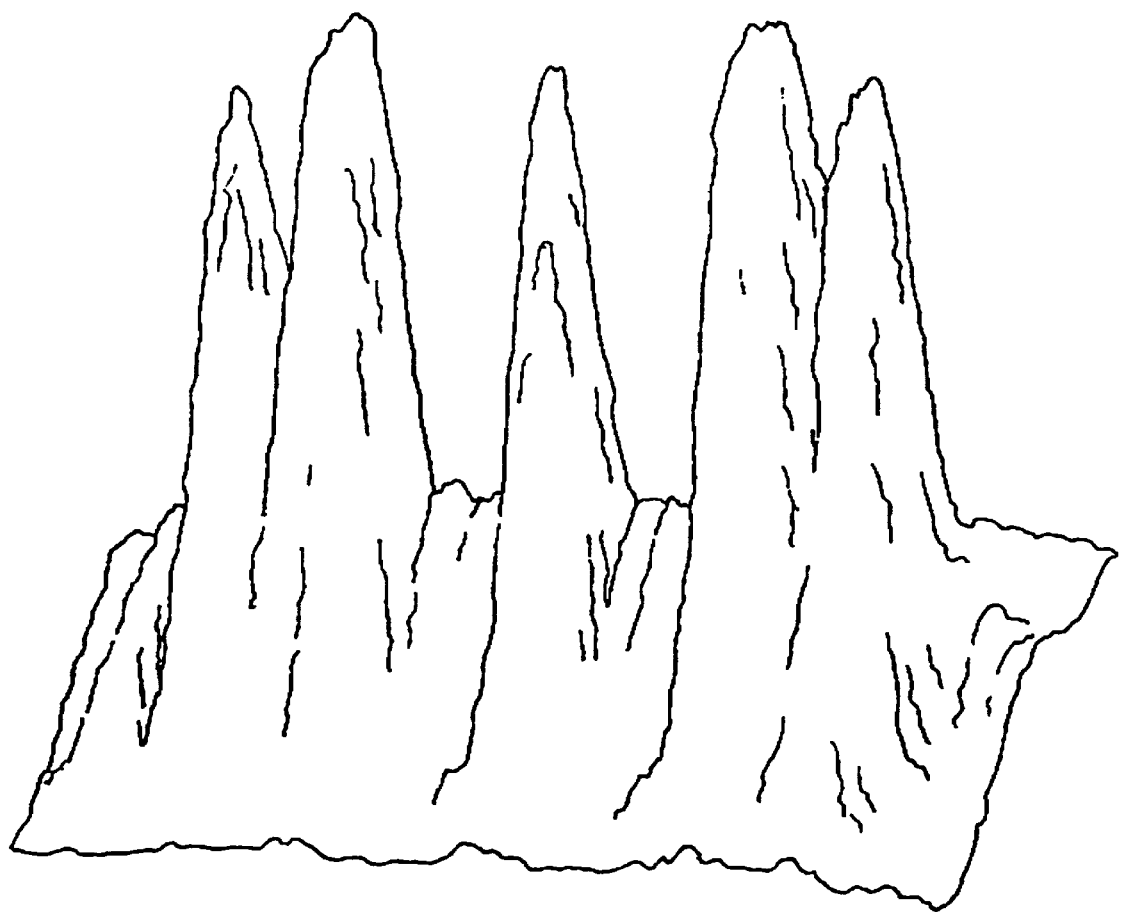
FIG. 15a is a three dimensional view of a Melles Griot model 56DLB104 laser typical light intensity profile.

For a given stand-off distance to target surface 22 it was found possible, by adjusting the amount of lateral offset of array 14, to place on pixels 68 the desired cross section of light spot image 70, the cross sections being normal to the long axis of light spot image 70. It was found desirable to select the cross section of light spot image 70 falling on pixels 68 because the light intensity profile across the long axis of light spot image 70 was not always a gaussian distribution. For example, as illustrated in FIG. 15a the Melles Griot laser creates a light spot image 70 having greater light intensity at opposed ends of the long axis of light spot image 70 rather than having its'maximum intensity in the centre of the light spot. Thus, if the light intensity profile is known for a selected stand-off distance and over the desired target range to be optimized, the amount of lateral offset of array 14 can be pre-selected to place the cross section of light spot image 70 having an optimal level of light intensity onto pixels 68.

As illustrated in FIGS. 13a through 13e, as target surface 22 is translated further away from device 10, when image plane 72 is offset relative to lens plane 74 (i.e. in the laterally offset array 14 arrangement illustrated in FIG. 12a) image plane 72 diverges relative to light spot 70. Consequently, as target surface 22 translates within the optimized target range, different cross sections of light spot image 70 impinge pixels 68 as image plane 72 moves relative to light spot image 70. It has been found however that because of the very small degree of lateral offset required to shift light spot image 70 laterally relative to array 14 and pixels 68(i.e. along the long axis of light spot image 70), that the amount of shift of image plane 72 relative to light spot image 70 as illustrated in FIGS. 13a through 13e, is relatively small. Thus, over the optimized target range a narrow band of optimal cross sections (optimized for light intensity and image width) of light spot image 70 may be selected to impinge pixels 68. This further optimizes the output signal from array 14 over the optimization already described above. It has been found with the transverse triangulation effect illustrated in FIGS. 12a, 12b, 13(a–e) and 14 (a–e) that relative uniformity in image width and amplitude may be achieved for short stand-off long target range sensors.

Figure 14:
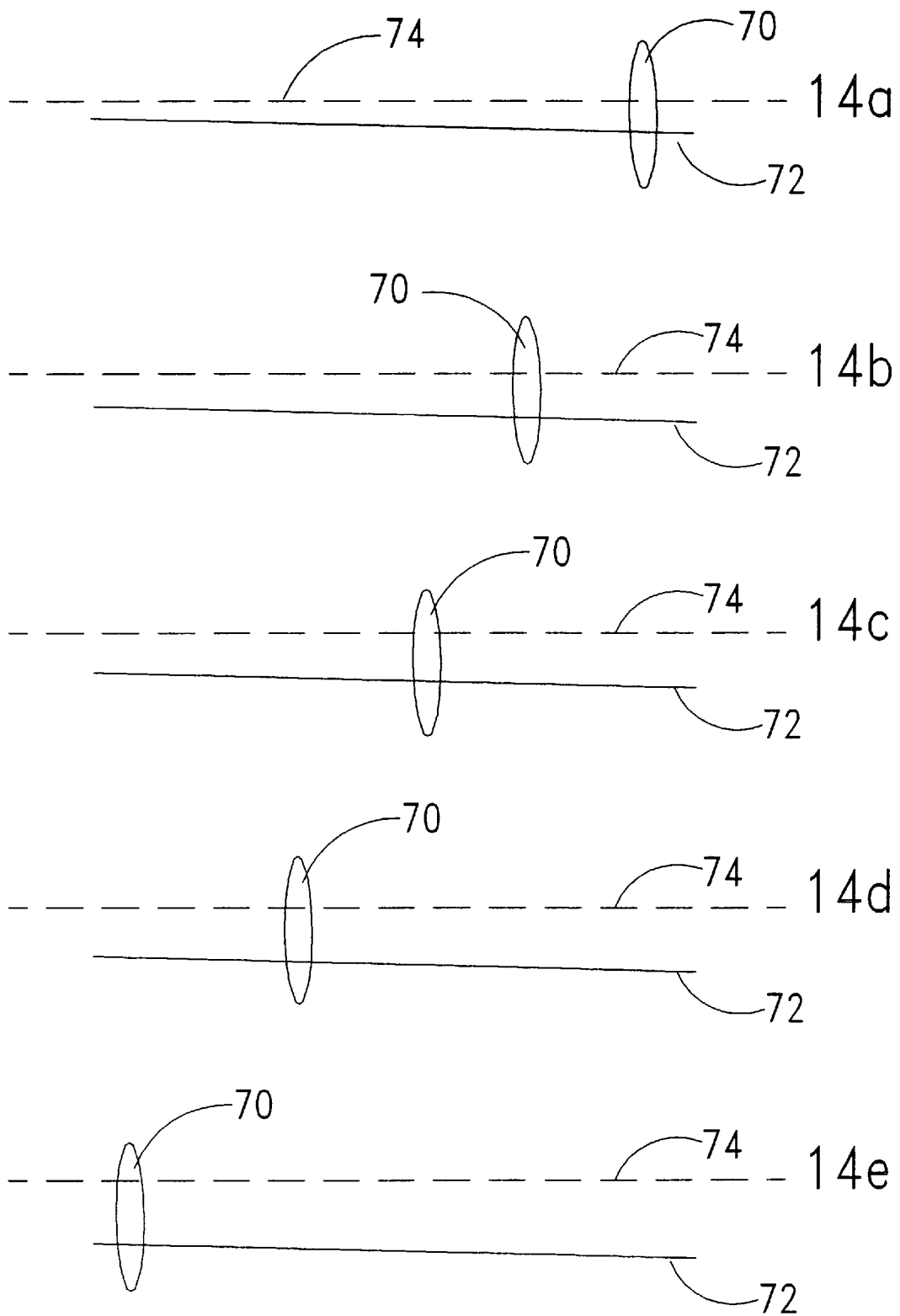
FIG. 14a is a cross sectional view along line 14a—14a in FIG. 12b with the array skewed.
FIG. 14b is a cross sectional view along line 14b—14b in FIG. 12b with the array skewed.
FIG. 14c is a cross sectional view along line 14c—14c in FIG. 12b with the array skewed.
FIG. 14d is a cross sectional view along line 14d—14d in FIG. 12b with the array skewed.
FIG. 14e is a cross sectional view along line 14e—14e in FIG. 12b with the array skewed.

It has been further found that, as illustrated in FIGS. 14a through 14e, if array 14 is skewed (see FIG. 12b) from the laterally offset arrangement illustrated in FIG. 12a relative to lens 16 in the direction indicated by arrow "A", the amount of movement of image plane 72 relative to light spot image 70 can be reduced. In FIG. 14, FIG. 14a corresponds to the spatial orientation of FIG. 13a in FIG. 12a, and likewise FIGS. 14b, 14c, 14d, and 14e correspond to the spatial orientation in FIG. 12a of FIGS. 13b, 13c, 13d and 13e respectively. Skewing the array provides an additional degree of freedom in optimizing the output signal of the array. One advantage is that skewing array 14 narrows the band of cross sections of light spot image 70 which will impinge pixels 68 as target surface 22 is translated within the desired target range. Again, to optimize the output signal of array 14 within the target range, image plane 72 is placed over the cross section of light spot image 70 having optimal light intensity and image width, and then skewed to keep image plane 72 as close to that narrowed band of cross sections as possible as light spot image 70 moves along the array of pixels 68 as a consequence of translation of target surface 22 towards, or away from, device 10. Skewing array 14 is also useful to compensate for inherent asymmetry in the optical system.

Figure 12C:
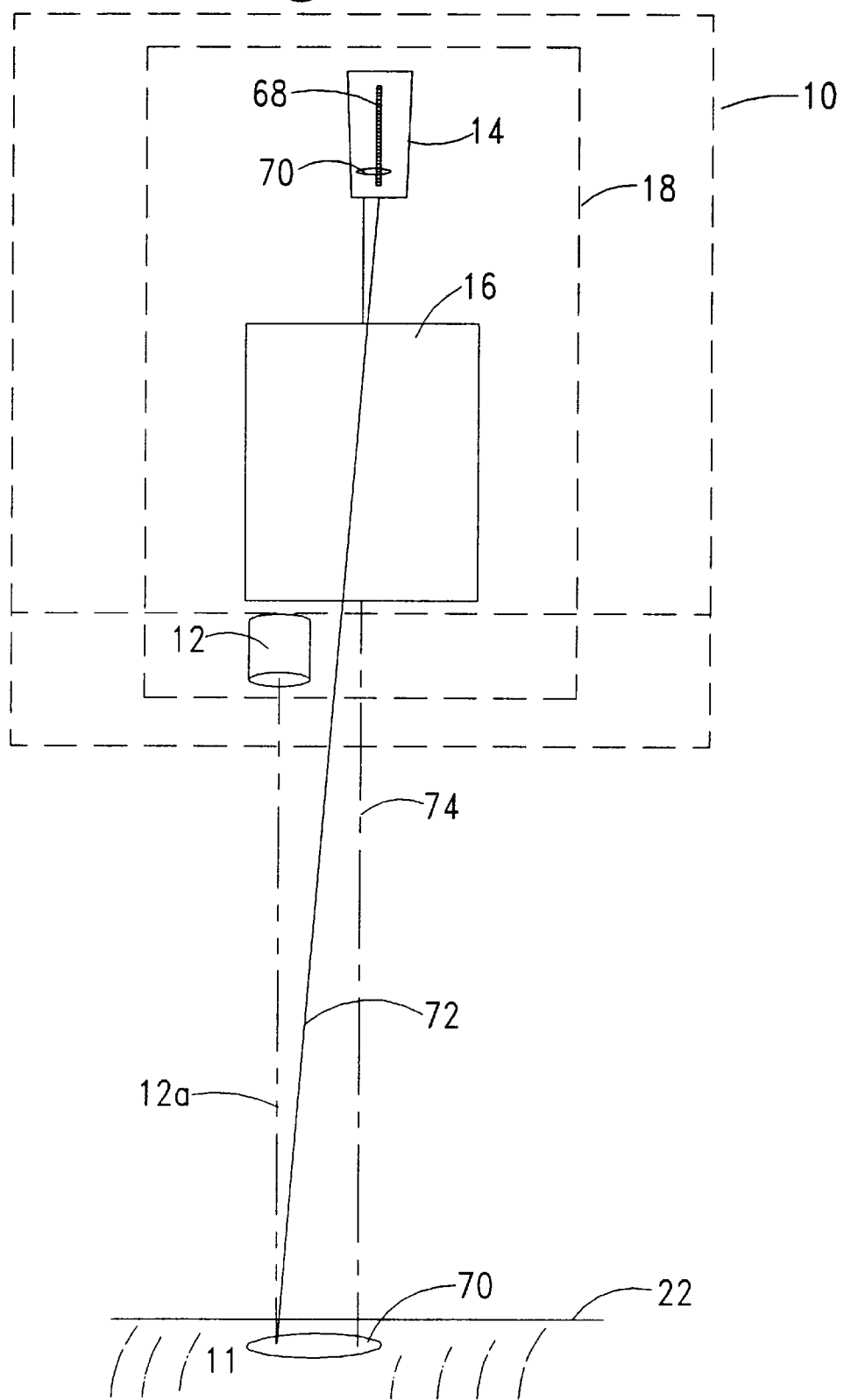
FIG. 12c is a cross sectional view along line 12—12 in FIG. 2 with laser diode laterally offset.
Figure 13:
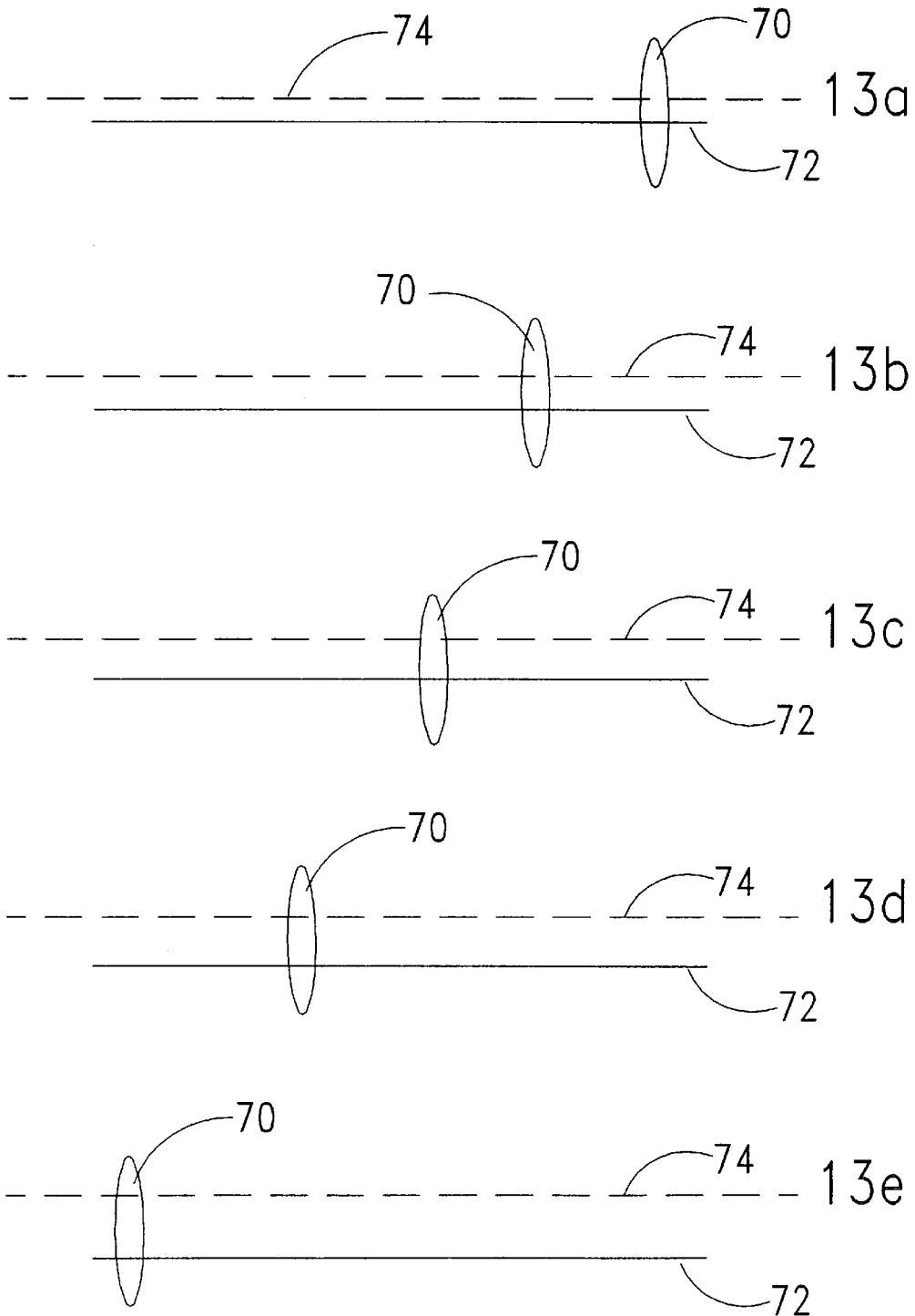

FIG. 12c illustrates a different physical arrangement in which laser diode 12 is offset to accomplish the same effect as the lateral offset of array 14 illustrated in FIG. 12a. That is, the amount of lateral or transverse offset of laser diode 12 can be pre-selected to place the cross section of light spot image 70 having an optimal level of light intensity onto pixels 68. Skewing of array 14 may be applied to this arrangement also.

Alternatively, the intensity distribution of the source optics can be designed for a particular stand-off, target range and offset, that is, change position of the lobes by a gradient attenuator or perhaps changing the shape of the optics so as to place a larger intensity lobe on pixels 68.

Figure 15B:
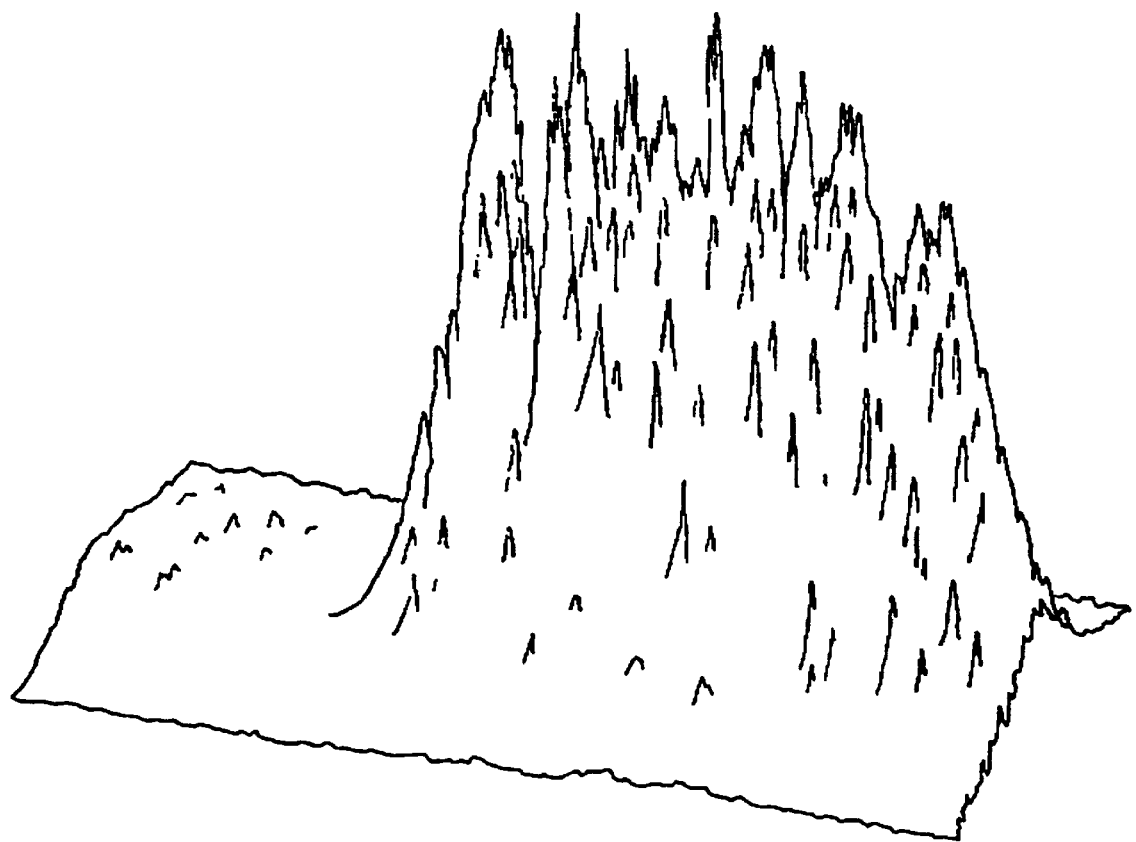
FIG. 15b is a three dimensional view of a Phillips CQL30 laser typical light intensity profile.

Methods in which the light source optics can be manipulated to assist in optimization when using transverse triangulation optimization, such as set out above, include
  (a) truncation causing a diffracted beam intensity profile (the method illustrated in FIGS. 12a and 12c), where such a diffracted profile is illustrated in FIG. 15a for a Melles Griot laser diode (model 56DLB104) at 25 inches stand-off distance and in FIG. 15b for a Philips CQL30 laser diode at 30 inches stand-off distance);
  (b) light beam focussed at a particular target distance to provide an intense light spot;
  (c) providing a laser having a closer to ideal, that is, closer to gaussian intensity profile; and
  (d) selectively spatially attenuating the light beam using, for instance, a neutral density filter, such as neutral density filter 76 (see FIGS. 10a and 10b), with an appropriate density profile to provide the optimal intensity level as a function of distance and laser axis offset.

Ambient light filter 78 may be provided to filter ambient light from the light impinging array 14 to thereby reduce optical noise.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for optimizing stib-pixel resolution in a triangulation based target distance measuring device at a desired stand-off distance comprises
    a laser light source projecting a light beam along a light beam axis so as to project a light spot onto a surface of a workpiece,
    a lens having an optical axis and a depth of focus dependent on said target distance, said lens for gathering reflected light from said light spot on said surface of said workpiece,
    a linear photodetector array of adjacent light detecting pixels, said array having a longitudinal array axis, said array for detecting light impinging said pixels and generating an output signal indicative of the position of said pixels being impinged by said light,
    said light beam axis, said optical axis, and said longitudinal array axis co-planar in a first plane,
    said lens imaging said reflected light across said array so as to impinge said array and form an image across said array, said output signal indicative of an intensity profile of said image impinging said array, said image defocused to a near-Scheimpflug condition so as to optimize said output signal from said array, whereby movement of said surface of said workpiece relative to said distance measuring device while said light spot is projected onto said surface causes corresponding movement of said image along said array.

2. The apparatus of claim 1 wherein said output signal is optimized over a pre-selected distance range from said desired stand-off distance by fixing at an optimized defocused, near-Scheimpflug condition, location said lens along said optical axis relative to said array whereby approximating as closely as possible to a gaussian distribution said intensity profile of said image impinging the said pixels, minimizing saturation of said pixels by said image impinging said pixels, optimizing the number of said pixels impinged by said image, and maximizing the amplitude of said intensity profile subject to minimizing said saturation of said pixels.

3. The device of claim 2 wherein said optimized number of said pixels impinged by said image is greater than 10 but less than 35.

4. The device of claim 3 wherein said distance between said distance measuring device and said surface of said workpiece does not exceed 36 inches.

5. The device of claim 4 wherein said distance between said distance measuring device and said surface of said workpiece does not exceed 30 inches.

6. The device of claim 5 wherein said distance between said distance measuring device and said surface of said workpiece does not exceed 20 inches.

7. In an apparatus for optimizing sub-pixel resolution in a triangulation based target distance measuring device at a desired stand-off distance having
    a laser light source projecting a light beam along a light beam axis so as to project a light spot onto a surface of a workpiece,
    a lens having an optical axis and a depth of focus dependant on said target distance, said lens for gathering light reflected from said light spot on said surface of said workpiece,
    a linear photodetector array of adjacent light detecting pixels, said array having a longitudinal array axis, said array for detecting light impinging said pixels and generating an output signal indicative of the position of said pixels being impinged by said light,
    wherein said light beam axis, said optical axis, and said longitudinal array axis are co-planar in a first plane,
    a method of optimizing said sub-pixel resolution comprising the steps of:
        (a) selecting said desired stand-off distance and a distance range for distances between said desired stand-off distance and said surface of said workpiece;
        (b) aligning said light beam axis, said optical axis, and said longitudinal array axis, so as to direct an image of said light spot onto said pixels for positions of said surface of said workpiece within said distance range;
        (c) adjusting the distance between said lens and said array along said optical axis so as to optimize over said distance range said output signal by defocusing said image to a near-Scheimpflug condition; and
        (d) fixing the position of said lens and said array along said optical axis when said image is optimized over said distance range.

8. The method of claim 7 comprising the further steps of:
    (a) minimizing saturation of said pixels by said image over said distance range;
    (b) optimizing the number of said pixels impinged by said image over said distance range; and
    (c) maximizing the light intensity of said image subject to minimizing said saturation of said pixels.

9. The method of claim 8 comprising the further step of restricting said optimized number of said pixels to between 10 pixels and 35 pixels.

10. The method of claim 9 comprising the further step of restricting the distance between said distance moving device and said surface of said workpiece so as not to exceed 36 inches.

11. The method of claim 10 comprising the further step of restricting said distance between said distance moving device and said surface of said workpiece so as not to exceed 30 inches.

12. The method of claim 11 comprising the further step of restricting said distance between said distance moving device and said surface of said workpiece so as not to exceed 20 inches.

* * * * *